United States Patent
Will et al.

(10) Patent No.: US 9,547,977 B2
(45) Date of Patent: Jan. 17, 2017

(54) SYSTEMS AND METHODS FOR AUTOMATED PERSONAL EMERGENCY RESPONSES

(71) Applicant: ROCKIWILLI RMR LLC, Renton, WA (US)

(72) Inventors: Travis E. Will, Renton, WA (US); Russell E. VanDevanter, Seattle, WA (US); Steven M. Myhre, Seattle, WA (US); Michael J. Myhre, Monroe, WA (US)

(73) Assignee: ROCKIWILLI RMR LLC, Renton, WA (US)

( * ) Notice: Subject to any disclaimer, the term of this patent is extended or adjusted under 35 U.S.C. 154(b) by 0 days.

(21) Appl. No.: 15/214,267

(22) Filed: Jul. 19, 2016

(65) Prior Publication Data
US 2016/0328952 A1    Nov. 10, 2016

Related U.S. Application Data

(63) Continuation-in-part of application No. 13/942,833, filed on Jul. 16, 2013, now Pat. No. 9,396,645, and a
(Continued)

(51) Int. Cl.
| | |
|---|---|
| *G08B 1/08* | (2006.01) |
| *G08B 25/01* | (2006.01) |
| *H04M 3/51* | (2006.01) |
| *H04M 3/46* | (2006.01) |
| *H04M 3/56* | (2006.01) |
| *H04M 1/725* | (2006.01) |

(Continued)

(52) U.S. Cl.
CPC ........ *G08B 25/016* (2013.01); *H04M 1/72536* (2013.01); *H04M 3/46* (2013.01); *H04M 3/5116* (2013.01); *H04M 3/56* (2013.01); *G06F 1/00* (2013.01); *H04L 1/00* (2013.01)

(58) Field of Classification Search
CPC ..................................... H04L 1/00; G06F 1/00
See application file for complete search history.

(56) References Cited

U.S. PATENT DOCUMENTS

| | | | | |
|---|---|---|---|---|
| 2002/0044682 | A1* | 4/2002 | Weil | G06T 7/004 |
| | | | | 382/154 |
| 2012/0327175 | A1* | 12/2012 | Couse | H04L 12/1818 |
| | | | | 348/14.08 |
| 2015/0208222 | A1* | 7/2015 | Dalton | A61B 5/1112 |
| | | | | 455/404.2 |

* cited by examiner

*Primary Examiner* — Shirley Lu
(74) *Attorney, Agent, or Firm* — Puget Patent; Michael Gibbons

(57) ABSTRACT

A subscriber device for use in an automated personal emergency response system implemented as a conference bridge on a remote computing network. The device, intended to be worn as a pendant, wristband or in another wearable configuration, includes a color high-resolution display for signaling a user of the subscriber device with notifications, arrows for directional guidance, and/or other status messages. The device also includes microphones and speakers for enabling a teleconference between a user of the subscriber device in need of assistance and parties joined to the teleconference via the automated personal emergency response system. The user of the subscriber device may initiate the call for assistance and teleconference via a press of a single button on the device; alternatively, accelerometers in the device may detect a fall and automatically initiate the call. The device can receive medical telemetry and provide it to conference participants and perform home automation tasks.

20 Claims, 19 Drawing Sheets

Related U.S. Application Data continuation-in-part of application No. 14/023,457, filed on Sep. 10, 2013, now Pat. No. 8,866,606, and a continuation-in-part of application No. 29/466,495, filed on Sep. 9, 2013, now Pat. No. Des. 696,223, and a continuation-in-part of application No. 29/540,749, filed on Sep. 28, 2015.

(51) Int. Cl.
*G06F 1/00* (2006.01)
*H04L 1/00* (2006.01)

FIG. 2

| Alarm Event | Response(s) | Contact Person(s) |
|---|---|---|
| Emergency | 1. Initiate Conference Network | 1. Emergency Dispatch |
| Fall Detector | 1. Interact With Subscriber Device; 2. If "OK" Status Confirmed, Conclude Alarm Event; Else, Initiate Conference Network. | 1. Caretaker; 2. If No Response, First Family Member; 3. If No Response, Emergency Dispatch. |
| Frightened | 1. Initiate Conference Network | 1. First Family Member and Caretaker; 2. If No Response, Emergency Dispatch. |
| Health Concern | 1. Initiate Conference Network | 1. Caretaker; 2. If No Response, Primary Care Doctor; 3. If No Response, First Family Member. |
| Locked Out of House | 1. Interact with Auxiliary Device; 2. If Unlock Successful, Conclude Alarm Event; Else, Initiate Conference Network. | 1. Property Manager; 2. If No Response, Neighbor; 3. If No Response, First Family Member; 4. If No Response, Control Center. |
| Need Directions | 1. Instruct Device to Navigate to a Waypoint; 2. If Navigation Successful, Conclude Alarm Event; Else, Initiate Conference Network. | 1. First Family Member; 2. If No Response, Second Family Member; 3. If No Response, Control Center. |
| Need Transportation | Initiate Conference Network | 1. First Family Member; 2. If No Response, Second Family Member; 3. If No Response, Control Center. |
| Smoke Alarm | 1. Send Status Check to Auxiliary Device; 2. If "OK" Status Confirmed, Conclude Alarm Event; Else, Initiate Conference Network. | 1. Emergency Dispatch |
| Vital Sign Monitor | 1. Initiate Conference Network | 1. Caretaker and Emergency Dispatch. |

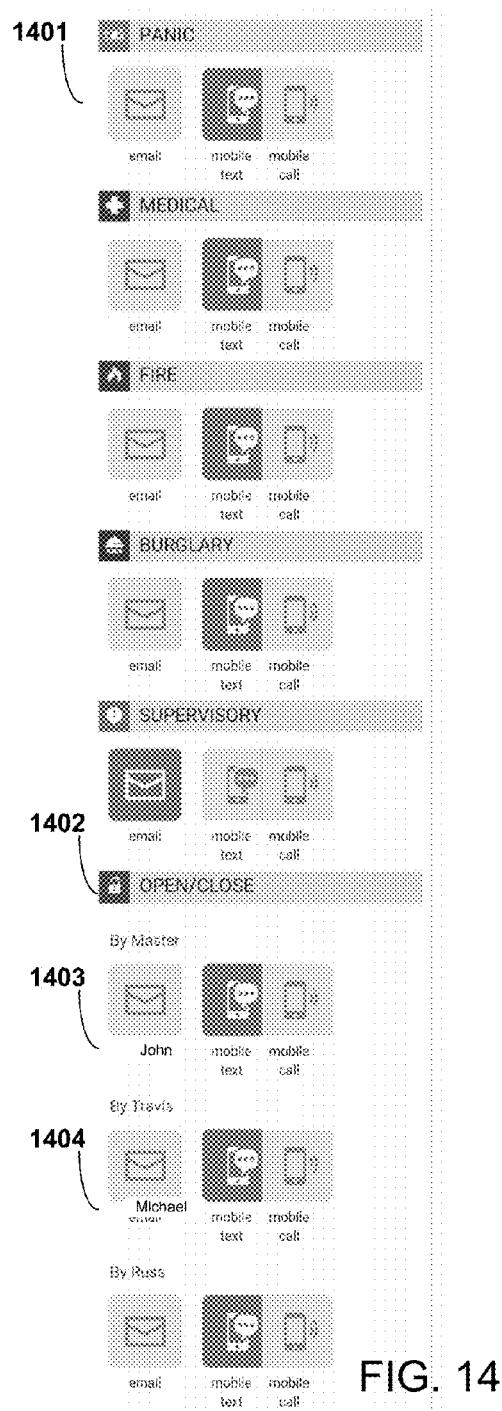
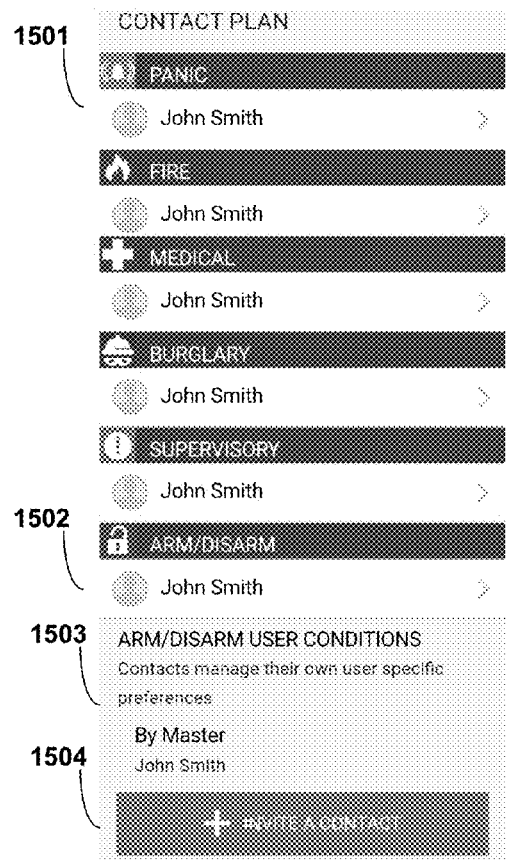
FIG. 14
FIG. 15

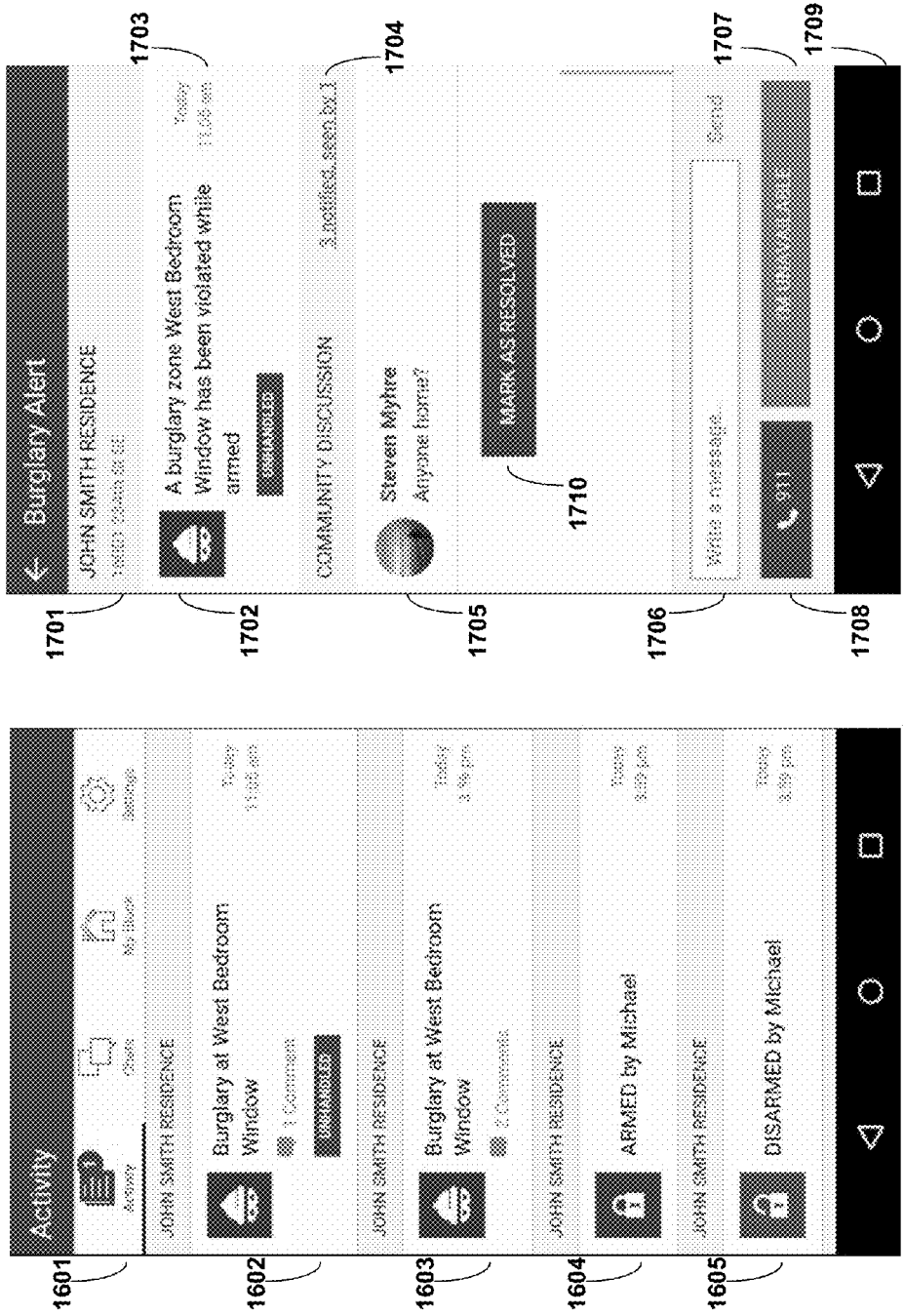

SYSTEMS AND METHODS FOR AUTOMATED PERSONAL EMERGENCY RESPONSES

PRIORITY CLAIM

The present application is related to and/or claims the benefits of the earliest effective priority date and/or the earliest effective filing date of the below-referenced applications, each of which is hereby incorporated by reference in its entirety, to the extent such subject matter is not inconsistent herewith, as if fully set forth herein:

(1) this application constitutes a continuation-in-part application of U.S. patent application Ser. No. 13/942,833, entitled SYSTEMS AND METHODS FOR AUTOMATED PERSONAL EMERGENCY RESPONSES (our ref. ROCK-1-1001-1), naming Travis E. Will; Russell E. Vandevanter; Steven M. Myhre; and Michael J. Myhre as inventors, filed Jul. 16, 2013 and issued on Jul. 19, 2016 as U.S. Pat. No. 9,396,645, which is currently co-pending or is an application to which the instant application is otherwise entitled to claim priority;

(2) this application constitutes a continuation-in-part application of U.S. patent application Ser. No. 14/023,457, entitled SYSTEMS AND METHODS FOR AUTOMATED PERSONAL EMERGENCY RESPONSES (our ref. ROCK-1-1002-1), naming Travis E. Will; Russell E. Vandevanter; Steven M. Myhre; and Michael J. Myhre as inventors, filed Jul. 16, 2013 and issued on Oct. 21, 2014 as U.S. Pat. No. 8,866,606, which is currently co-pending or is an application to which the instant application is otherwise entitled to claim priority;

(3) this application constitutes a continuation-in-part application of U.S. patent application Ser. No. 29/466,495, entitled ALERTING DEVICE (our ref. ROCK-1-1003-1), naming Travis E. Will; Russell E. Vandevanter; Steven M. Myhre; and Michael J. Myhre as inventors, filed Sep. 9, 2013 and issued on Dec. 24, 2013 as U.S. Design patent No. D696,223, which is currently co-pending or is an application to which the instant application is otherwise entitled to claim priority; and (4) this application constitutes a continuation-in-part application of U.S. patent application Ser. No. 29/540,749, entitled ALERTING DEVICE (our ref. ROCK-1-1004-1), naming Travis E. Will; Russell E. Vandevanter; Steven M. Myhre; and Michael J. Myhre as inventors, filed Sep. 28, 2015, which is currently co-pending or is an application to which the instant application is otherwise entitled to claim priority.

FIELD OF THE INVENTION

The present disclosure relates generally to personal emergency response systems, and more specifically, to automated personal emergency response systems, methods for responding to personal emergency response system alarm events, and methods for managing care for subscribers to a personal emergency response system.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Personal emergency response systems are alarm systems designed to summon emergency medical personnel in the event of an emergency. Elderly people and disabled people who live alone commonly use personal emergency response systems. Personal emergency response systems are typically monitored by a central control center. Users typically must subscribe to services offered by personal emergency response system monitoring service providers.

In cases of emergency, such as after a fall or a suddenly appearing ailment, a subscriber of a personal emergency response system can trigger an alarm event by pressing a button on a subscriber device. Typical subscriber devices include pendants worn around the neck, wristbands, or other devices that are carried by a subscriber. The device typically has a wireless transmitter that can be activated by the subscriber in the event of an emergency.

In some systems, when an alarm event is triggered, the transmitter sends an alarm to a central monitoring station. Medical personnel are then dispatched to the site where the alarm was activated. In other systems, there is no central monitoring system, and the subscriber simply programs the numbers of family members, neighbors, or local emergency responders.

Monitoring services for personal emergency response systems generally consist of a call center staffed by trained professionals. These professionals are available at all times to receive calls. Some monitoring services employ trained medical staff as call center operators, which enables the monitoring service to better evaluate a subscribers medical requests. Monitoring services can be quite expensive, thereby driving up the cost of subscribing to a personal emergency response system.

Some personal emergency response systems are used not only for emergencies, but also as a means to conveniently ask questions about concerning symptoms, or for help with day-to-day activities such as shopping, cleaning, or to arrange for transportation.

Those skilled in the art will appreciate that personal emergency response systems can be used for a multitude of applications. However, the cost of monitoring services can limit the scope of services offered. There exists, therefore, a need for a more cost effective means for providing comprehensive personal emergency response system services. Additionally, there exists a need for a personal emergency response system that recognizes various types of alarm events and directs the various alarm events to the appropriate party or parties.

Those skilled in the art will further appreciate that access to information about a subscriber and the subscribers health conditions can enable medical professionals, caregivers, family members, and emergency response teams to be more responsive in a given situation. Despite advances in technology, personal medical information tends to be fragmented among several parties. This is especially true for medical information that is not formally documented. For example, friends, family members, or caregivers may acquire an intimate awareness of a person's medical history based on an accumulation of knowledge over a period of ongoing interactions. Other medical professionals may not have access to this information unless there is an opportunity to converse directly with such friends, family members, or caregivers. Similarly, medical professionals have knowledge and information that could benefit or improve the effectiveness of the day-to-day care activities provided by such friends, family members, or caregivers. Furthermore, information can be obtained from various auxiliary devices used to monitor the health status of a patient or environmental factors around the patient's residence. This information, however, is not readily accessible by parties in remote locations. Given these shortcomings, there exists a need for a personal emergency response system that enables the sharing of information in order to help personal emergency response system responders to be more responsive to various situations in which personal emergency response systems can be used.

These and other problems concerning personal emergency response systems represent long-felt yet unmet needs. Therefore, systems and methods for solving the aforementioned problems are desirable. The embodiments disclosed herein have the potential to provide meaningful benefits to subscribers of personal emergency response systems, health care providers, physicians, insurance companies, emergency dispatch centers, and personal emergency response system service providers.

SUMMARY

A summary of certain embodiments disclosed herein is set forth below. It should be understood that these aspects are presented merely to provide the reader with a brief summary of these certain embodiments and that these aspects are not intended to limit the scope of this disclosure.

Embodiments of the present disclosure relate generally to personal emergency response systems, and more specifically, to automated personal emergency response systems, methods for responding to personal emergency response system alarm events, and methods for managing care for subscribers to a personal emergency response system.

In some embodiments, an automated personal emergency response system comprises an alarm server, a response server, and a data warehouse. The alarm server may be configured to detect alarm events from one or more subscriber devices, to ascertain the nature of an alarm event based on a plurality of alarm event types, and to trigger one or more responses to an alarm event.

In a preferred embodiment, the response server is configured to allow two-way communications and data transmissions among one or more parties and a subscriber device. In some embodiments, the personal emergency response system is configured to enable remotely interacting with one or more auxiliary devices.

In some embodiments, the personal emergency response system is configured to ascertain a class of one or more parties based on the nature of the alarm event, and to give notice to the one or more parties, the notice comprising instructions to join a conference network.

In some embodiments, a computer-implemented method for responding to a personal emergency response system alarm event comprises detecting an alarm event from a subscriber device, ascertaining the nature of the alarm event based on a plurality of alarm event types, and triggering one or more responses to the alarm event. In a preferred embodiment, the one or more responses depend on the nature of the alarm event.

In some embodiments, a computer-implemented method for managing care for a subscriber of a personal emergency response system comprises registering a subscriber device that is configured to enable two-way communications and data transmissions among one or more parties and the subscriber device, designating a plurality of alarm event types, and designating for each alarm event type, one or more responses to be triggered when an alarm event is detected, the one or more responses depending on the nature of the alarm event.

In some embodiments, a subscriber device comprises an article of manufacture including at least a user interface module; a communications module; an audio module; a positional awareness module; a control module; and a power module. In a preferred embodiment, the subscriber device is configured for transmitting alarm events to the alarm server, facilitating two-way communications and data transmissions between the subscriber device and one or more parties, and receiving registration data.

In addition to the foregoing, various other methods, systems, and non-transitory computer-readable media are set forth and described in the teachings of the present disclosure.

The foregoing summary may contain simplifications, generalizations, inclusions, and/or omissions of detail; consequently, those skilled in the art will appreciate that the summary is illustrative only and is not intended to be in any way limiting. In addition to the illustrative aspects, embodiments, and features described above, further aspects, embodiments, and features will become apparent by reference to the drawings, claims, and the following detailed description.

BRIEF DESCRIPTION OF THE DRAWINGS

FIG. 2 shows a table detailing one embodiment of various responses to various personal emergency response system alarm events.

FIG. 14 shows a screen for setting notification preferences for a particular user.

FIG. 15 shows a screen for configuring a contact plan for a particular residence being monitored.

FIG. 16 shows an activity screen which may be viewable on a mobile device using a mobile CERS app.

FIG. 17 shows a status screen relating to an alert, and particularly, to the new and unhandled alert 1602 of FIG. 16.

DETAILED DESCRIPTION

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here. The following detailed description is therefore not to be taken in a limiting sense, and the scope of the claimed subject matter is defined by the appended claims.

Figure 1:
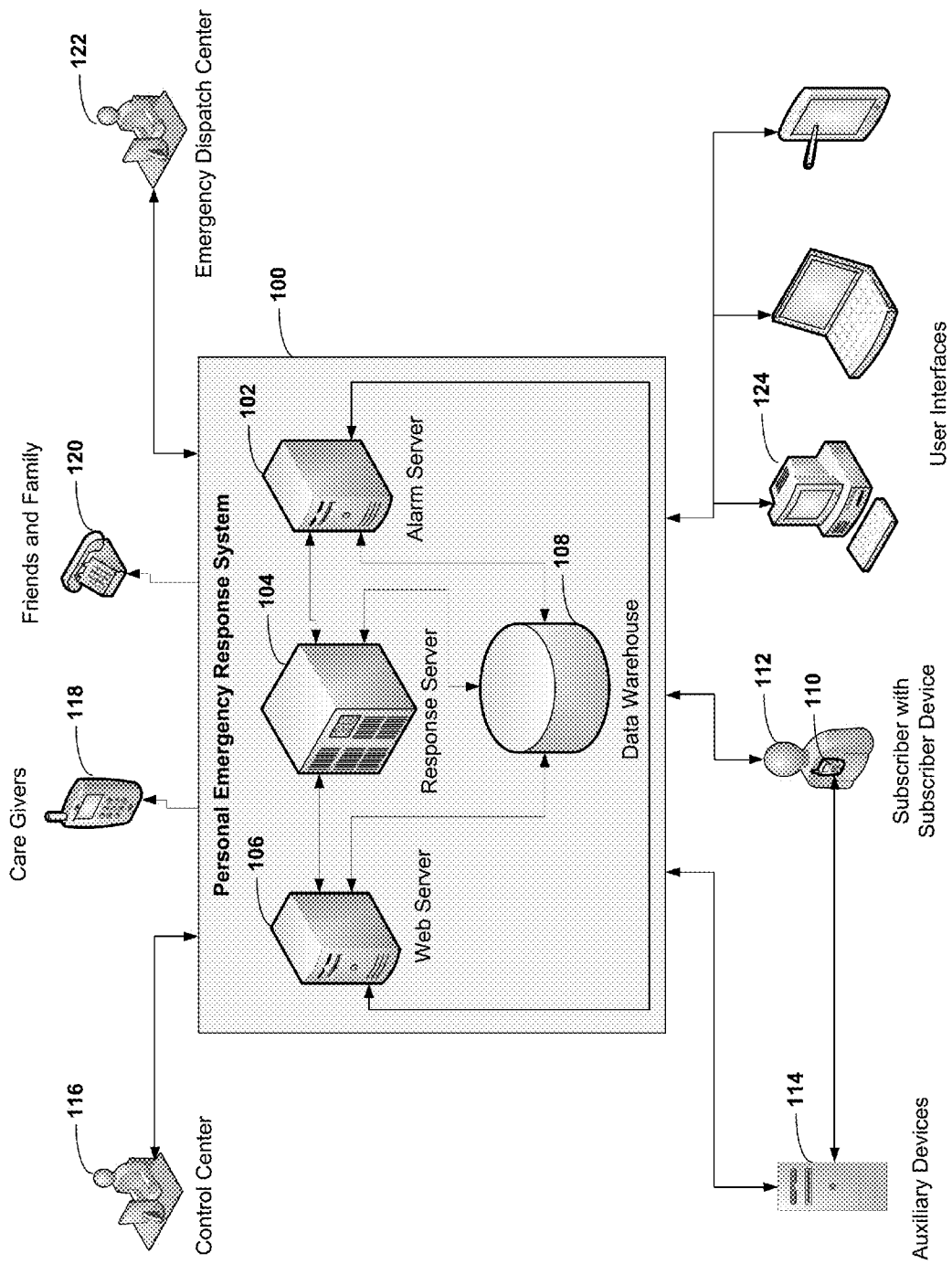
FIG. 1 shows an exemplary embodiment of a personal emergency response system.

FIG. 1 shows an exemplary embodiment of a personal emergency response system 100. Those skilled in the art will appreciate that numerous other embodiments of personal emergency response systems are within the spirit and scope of the disclosure herein.

The embodiment shown in FIG. 1 comprises an alarm server 102, a response server 104, a web server 106, and a data warehouse 108. The alarm server 102, the response server 104, and the web server 106 may be configured to interact with the data warehouse 108, and with one another.

The personal emergency response system 100 is configured to interact with subscriber devices 110 worn or carried by subscribers 112. A subscriber device may be a handheld mobile cellular, personal communication service, or other wireless communications device. In a preferred embodiment, a single dedicated button on the subscriber device may be used to alert the personal emergency response system of the occurrence of an alarm event. The subscriber device may also have a plurality of buttons, with different buttons configured to trigger different alarm events. In some embodiments, the subscriber device is configured to automatically trigger an alarm event. For example, the subscriber device may trigger an alarm event upon the occurrence of a specified condition. In some embodiments, a subscriber device may be equipped with one or more sensors which may be configured to trigger alarm events.

In some embodiments, a subscriber device may have a visual display screen that may be configured to enable tactile or touch-screen interactions with various menu options. In some embodiments, a subscriber device may be configured to enable a subscriber to interact with the subscriber device through audible voice prompts. For example, a subscriber device may be configured to allow a subscriber to initiate an alarm event simply by calling out the word "HELP!" or by calling out some other word associated with an alarm event. Even if the subscriber device is not connected to the personal emergency response system at the time of an audible voice prompt, the subscriber device may be configured to automatically establish a connection, trigger an alarm event, and transmit data to the personal emergency response system, including the content of the audible voice prompt and contemporaneous audio. In some embodiments, a subscriber device may be equipped with video communications functionalities such that a subscriber may engage in video conferencing with other parties. Video conferencing may be initiated upon the occurrence of an alarm event, or parties initiate video conferencing with a subscriber to check-in or casually communicate with the subscriber. Since many subscribers of personal emergency response systems are elderly and may have difficulty hearing or seeing, it is advantageous to provide subscriber devices having visual and audible methods of interacting.

In a preferred embodiment of the personal emergency response system 100, the alarm server 102 is configured to detect alarm events from one or more subscriber devices 110, to ascertain the nature of an alarm event based on a plurality of alarm event types, and to trigger one or more responses to an alarm event. In a preferred embodiment, the responses triggered by the alarm server 102 depend on the nature of the alarm event. In a preferred embodiment, no human operator is needed to detect an alarm event and trigger responses to the alarm event. Those skilled in the art will recognize that the alarm server may be connected to a subscriber device using mobile cellular, personal communication service, web-based wireless network, or other wireless communications technologies. In some embodiments, a continuous connection may be maintained between the alarm server and a subscriber device. This may be advantageous in situation where continuous, real-time monitoring is desirable, for example, where a subscriber suffers from a physical or mental health condition that should not go unmonitored. In alternative embodiments, a connection between the alarm server and a subscriber device may be periodic or intermittent. In situations where continuous monitoring is infeasible, expensive, or unnecessary, periodic or intermittent connections between the alarm server and a subscriber device may be appropriate.

In a preferred embodiment, the personal emergency response system 100 is configured to receive data transmitted from subscriber devices. The data may be recorded and stored in the data warehouse 108. Data may be continuously or intermittently transmitted from subscriber devices. Data transmitted from subscriber devices may include configuration information, subscriber status information, such as GPS location or "safety switch" check-ins, and may also include information associated with an auxiliary device.

Recording functionalities may be incorporated into a subscriber device, or data transmitted from the subscriber device may be recorded at the personal emergency response system. The connections between the personal emergency response system and the subscriber devices, whether continuous or intermittent, facilitate the recording and storing of data. In an alternative embodiment, a connection between the personal emergency response system and a subscriber device may be established via a local network with an internet connection, thereby enabling data to be transmitted from the subscriber device and stored in the data warehouse 108. In some embodiments, the web server 106 may enable the connection between the personal emergency response system and a subscriber device.

In the embodiment of the personal emergency response system 100 shown in FIG. 1, the response server 104 is configured to carry out one or more responses to an alarm event. In some embodiments, the alarm server 102 triggers the response server 104 to carry out responses to an alarm event. Those skilled in the art will appreciate that the alarm server 102 and the response server 104 may be configured to interact with one another via computer program functionalities.

In some embodiments, upon the occurrence of an alarm event the personal emergency response system is configured to give notice to one or more parties to join a conference network. The one or more parties may be pre-defined, and may vary depending on the nature of the alarm event. The notice to join a conference network may be provided by telephone call, automated voice messaging, text message, e-mail, or similar means. Once one or more parties join the conference network, in a preferred embodiment, the response server 104 is configured to allow two-way communications and data transmissions among one or more parties and a subscriber device 110. Two-way communications may be facilitated among multiple parties using a private branch exchange, telephone trunk conference bridge, or other telephone exchange or network. These technologies are advantageous because they enable multiple parties to each talk and listen to one another. In some embodiments, some or all of the parties to the conference network may be able to mute one another or perform other in-conference functionalities.

In various embodiments, the parties that may be included in a conference network comprise a control center 116, or control center personnel, such as the type which provides monitoring services for the personal emergency response system; care givers 118, such as those which provide subscribers 110 with day-to-day care, as well as primary care doctors and other medical service providers; friends and family 120, including neighbors, immediate family members, or close friends that a subscriber 112 tends to rely on for addressing various needs and concerns; and an emergency dispatch center, such as a 911 dispatch center, public safety answering point, or public safety access point. In a preferred embodiment, an emergency dispatch center 122 will be staffed with operators trained to obtain relevant information from callers necessary to dispatch appropriate emergency services. Those skilled in the art will appreciate that in addition to the aforementioned parties, the personal emergency response system 100 of FIG. 1 may be configured to allow two-way communications and data transmissions among a multitude of other parties.

In a preferred embodiment, the personal emergency response system 100 includes audio recording functionalities. Audio may be recorded from the subscriber device, including the subscriber's voice and surrounding sounds, as well as the audio from any of the parties that join the conference network. In some embodiments, audio is recorded from the moment an alarm event is triggered and continuing until the conclusion of the alarm event.

The embodiment of the personal emergency response system 100 shown in FIG. 1 is also configured to remotely interact with one or more auxiliary device 114. Auxiliary devices may include healthcare systems and devices, home automation systems and devices, and other systems and devices that may be used by a subscriber or provided to a subscriber by a care provider, friend or family member, or personal emergency response system service provider in order to improve the level of monitoring services provided to the subscriber or to integrate the services provided to the subscriber with other complimentary services. Healthcare systems and devices may include glucose monitors, dosimeters, heart monitors, wave form monitors, pacemakers, oximeters, dosimeters, blood glucose monitors, and other systems and devices for monitoring a subscribers vital signs and health status. Home automation systems and devices may include alarm systems, automatic door locks, automatic outlets, and climate control systems and devices.

Interactions with an auxiliary device may be continuous or periodic, and may occur as a response to an alarm event or in connection with monitoring an auxiliary device. In some embodiments, the existence of a certain condition associated with an auxiliary device will trigger alarm event. In some embodiments, information may be transmitted from an auxiliary device to the personal emergency response system. Similarly, information may be transmitted from the personal emergency response system to an auxiliary device.

An auxiliary device may be accessible to the personal emergency response system 100 through a wireless network, with a connection directly to the personal emergency response system. Alternatively, an auxiliary device may connect direct to a subscriber device 110, with the subscriber device 110 having a connection directly to the personal emergency response system 100. In some embodiments, an auxiliary device may be connected to a subscriber device using a wireless personal area network, such as wireless USB, Bluetooth, Z-Wave, ZigBee, or other low power radio frequency connection. In alternative embodiments, an auxiliary device may be connected directly to the personal emergency response system using a mobile cellular, personal communication service, web-based wireless network, or other wireless communications technologies.

The personal emergency response system 100 may also be configured to interact with various user interfaces 124. In a preferred embodiment, the user interfaces 124 interact with the personal emergency response system 100 through the web server 106. User interfaces 124 may be configured to enable a multitude of interactions with the personal emergency response system. Through a user interface, subscribers may register and configure a subscriber device, and make changes to the configuration, and interact with subscriber settings for the personal emergency response system. These configurations and settings may be transmitted to the subscriber device through the connection between the subscriber device and the personal emergency response system, or through a wireless connection between the subscriber device and a local area network connection to the Internet.

In some embodiments, user interfaces may be configured to enable other users to interact with subscriber settings. For example, user interfaces may enable access for a subscriber's care givers, friends and family, or call center operators at a monitoring service for the personal emergency response system. In a preferred embodiment, a user interface is made available to enable control center operators, care givers, friends and family, or emergency dispatch operators, or other parties to interact with the subscriber, subscriber device, or auxiliary device in response to an alarm event. A user interface may also be configured to review data associated with a subscriber device that has been stored in the data warehouse 108. In a preferred embodiment, subscriber data may be displayed in a user interface with a "dashboard" format with options to "drill-down" to view increasingly more detailed information.

In some embodiments, a user interface may be deployed using web-based technologies. For example, a user interface may be accessible on a web page by any computing device with a web browser and an Internet connection. Alternatively, a user interface may consist of a mobile phone application, making the personal emergency response system accessible by a handheld mobile phone, tablet computer, or other wireless communications device.

In other embodiments, a user interface may utilize dual-tone multi-frequency signaling, such as touch-tone dialing to enable a party to interact with the personal emergency response system using a telephone having push-button telephone keypad functionality. Those skilled in the art will appreciate that various other multi-frequency signaling technologies or pulse dialing technologies may be employed. Alternatively, similar user interfaces may enable parties to interact with the personal emergency response system using a digital keypad, such as on a mobile phone. Various commands may be associated with certain buttons on the keypad, or users may be provided with menu options, and certain buttons on the keypad maybe used to select from among the options.

FIG. 2 shows a table detailing one embodiment of various responses to various personal emergency response system alarm events. Those skilled in the art will appreciate that numerous other embodiments, including a multitude of alternative alarm events, responses, response sequences, contact persons, and contact sequences are within the spirit and scope of the disclosure herein.

In some embodiments, responses to an alarm event include initiating a conference network, interacting with the subscriber device, interacting with an auxiliary device, recording alarm event content, and concluding the alarm event. An alarm event may be assigned one or more responses. Multiple responses to an alarm event may be carried out concurrently, or in sequence. Various responses and contact persons associated with alarm events may be designated using a user interface 124.

In some embodiments, an alarm event triggers personal emergency response system to initiate a conference network. The conference network may be initiated immediately in response to an alarm event, or the conference network may be initiated subsequent to or concurrently with other responses. As shown in the embodiment described in FIG. 2, one or more contact persons may be given notice to join the conference network. In a preferred embodiment, the one or more parties to whom notice is given to join a conference network comprise the one or more parties that are preferred to respond to the alarm event. A party may be preferred to respond to an alarm event for a variety of reasons, including the expected timeliness of a response, the ability to provide an appropriate response, a party's skills and experiences relative to the nature of the alarm event, the party's relation to the subscriber, a party's known schedule or availability, or a party's physical location relative to the subscriber. Additionally, a party may be preferred to respond to an alarm event based on the relative cost of having such party respond as compared to alternative parties. Multiple parties may be given notice to join a conference network concurrently, or in sequence. Notification sequences may include groups of parties to be notified concurrently at one or more stages in the sequence.

In a preferred embodiment, if the alarm event is an emergency, then as shown in FIG. 2, emergency dispatch is given notice to join the conference network. In a preferred embodiment, if an alarm event is not an emergency, the initial notice to join the conference network is provided to parties other than emergency dispatch operators. For example, notice could be first given to a friend or family member, or to a health care provider. Notice may be given concurrently or in sequence. In a preferred embodiment, alarm events that are associated with a low level of hazard or concern are associated with responses and contact persons that are appropriate for resounding, rather than emergency dispatch or control center operators. For example, an alarm event indicating that a subscriber needs transportation may trigger the personal emergency response system to contact a friend or family member of the subscriber. In some embodiments, where the personal emergency response system gives notice to emergency dispatch or control center operators, requesting that they join the conference network, if other notified parties do not timely join the conference network.

In some embodiments, data transmitted from the subscriber device or from an auxiliary device is made available to one or more parties. Such data may be made available to all parties that are notified to join the conference network, or to a subset of such parties. For example, data may be provided only to emergency dispatch and not to other parties. In some embodiments, a password may be required to access data. In some embodiments, different subsets of data may be available to different parties. Data that may be made available may include GPS location, direction of travel and speed, and positional orientation of the subscriber device, as well as audio feeds, video feeds, environmental information, and sensory information from the subscriber device, such as fall-sensor data. Additionally, data made available may include auxiliary device information such as medical sensor information or home automation system information. Further, data made available may include data stored in the data warehouse 108, such as the subscriber's personal information and historical data associated with the subscriber device or the subscriber. Personal information may include vital life information, insurance information, preferred medical provider, physicians, hospital information and contact information.

In some embodiments, the subscriber device may be configured to provide instructions or alerts to a subscriber, including text, color, voice or audible sound, and combinations thereof. For example, the personal emergency response system may be configured to send instructions to a subscriber in response to an alarm event. Instructions may include navigation to a waypoint, or instructions for performing personal care procedures such a taking medication or self-treating a minor ailment. In some embodiments, instructions may be automatically sent to a subscriber device in response to an alarm event. This may be advantageous for alarm events of low concern, such as if a subscriber simply forgot how to perform a simple task.

In some embodiments, a subscriber device may be equipped with a fall detection sensor or device orientation sensor. The occurrence of a detected fall or the occurrence of a horizontal position of the device may trigger an alarm event. Different alarm events may be associated with different types of detected falls or with the duration that the sensor remains in the horizontal position. For example, if a fall appears severe, the alarm event may initiate the conference network directly with emergency dispatch. Conversely, if a fall appears minor, the personal emergency response system may send an automated response requesting that the subscriber confirm that he or she is okay, and initiate the conference network absent timely confirmation from the subscriber that he or she is okay. In some embodiments, an alarm event associated with a fall sensor may trigger the personal emergency response system to give notice to a heath care provider or a family member to join the conference network, and then initiate a conference network with emergency dispatch if the health care provider or family member do not timely respond.

In some embodiments, a subscriber may trigger an alarm event if the subscriber is lost. In response, navigation to a way-point may be provided on the subscriber device. The subscriber device may be prompted to provide navigation automatically upon the occurrence of an alarm event. For example, an alarm event associated with being lost may trigger navigation instructions to be automatically sent to the subscriber device. Additionally, a party to the conference network may prompt the personal emergency response system to provide navigation instructions upon learning during the conference that the subscriber is lost. In some embodiments, an alarm event may be triggered if a subscriber device is detected to be outside of a certain region. One response to such an alarm event may be an automatic prompt, requesting that the subscriber confirm that they are not lost or that they are okay. Confirmation may conclude the alarm event, or absent confirmation, subsequent responses may be triggered, such as initiating a conference network with one or more parties. In some embodiments, various navigation waypoints may be pre-programmed using the user interface 124.

In some embodiments, navigation instructions may be simplified and condensed, such as only including a simple directional arrow and distance to a waypoint. The directional arrow may indicate turns when needed and distance to the desired waypoint. Such simplified instructions may be advantageous where the subscriber may not have cognitive abilities or resources available to comprehend more complicated navigation instructions.

In some embodiments, a subscriber device may be associated with one or more auxiliary devices. Conditions related to an auxiliary device may trigger alarm events. An alarm event may be triggered if a healthcare device transmits a measurement that falls outside of a desired range. For example, if a heart rate monitor transmits an irregular heartbeat, an alarm event may be triggered, thereby enabling timely response without the need for the subscriber to manually summon for help. Similarly, an alarm event may be triggered if a home automation device indicates that something is amiss in the home. For example, if a subscriber is locked out of the home, the subscriber may trigger an alarm event to cause a home automation system to automatically unlock the door to allow the subscriber to gain access to the home without having to directly contact a friend, neighbor, or property manager. Additionally, in some embodiments parties responding to an alarm event may interact with auxiliary devices to better enable an appropriate response. For example, a responding party may view data transmitted from auxiliary devices to help diagnose the nature of a subscriber's condition. A responding party may also transmit instructions to an auxiliary device that are responsive to an alarm event.

In some embodiments, information associated with auxiliary devices may be transmitted to the personal emergency response system and stored in the data warehouse 108, thereby enabling authorized persons to access such information as needed. Such auxiliary device information may be displayable to parties upon the occurrence of an alarm event, or alternatively may be accessible on an ad-hoc basis. Access settings may be defined via a user interface for various parties.

In some embodiments, the personal emergency response system may be configured to provide reminders to a subscriber. The reminder may comprise a visual, audio, or tactile alert. Reminders may include medicine reminders, appointment reminders, meal time reminders, and reminders of other information that a subscriber may need to recall throughout the day. Reminders may be programmed into the personal emergency response system and associated with a subscriber device by the subscriber, or by friends, family members, health care providers, control center operators, or other parties through a user interface accessible via a web browser, smart phone application or other device. In some embodiments, the reminder schedules are stored on the subscriber device such that a connection between the subscriber device and the personal emergency response system is not necessary for the reminders to be prompted on the subscriber device.

In some embodiments, a subscriber may be prompted to acknowledge that a task has been performed. The task may be derived from a reminder schedule or from a third-party such as a health care provider, physician, or family member. In some embodiments, an alarm event may be triggered absent timely confirmation that the task has been performed.

Figure 3:
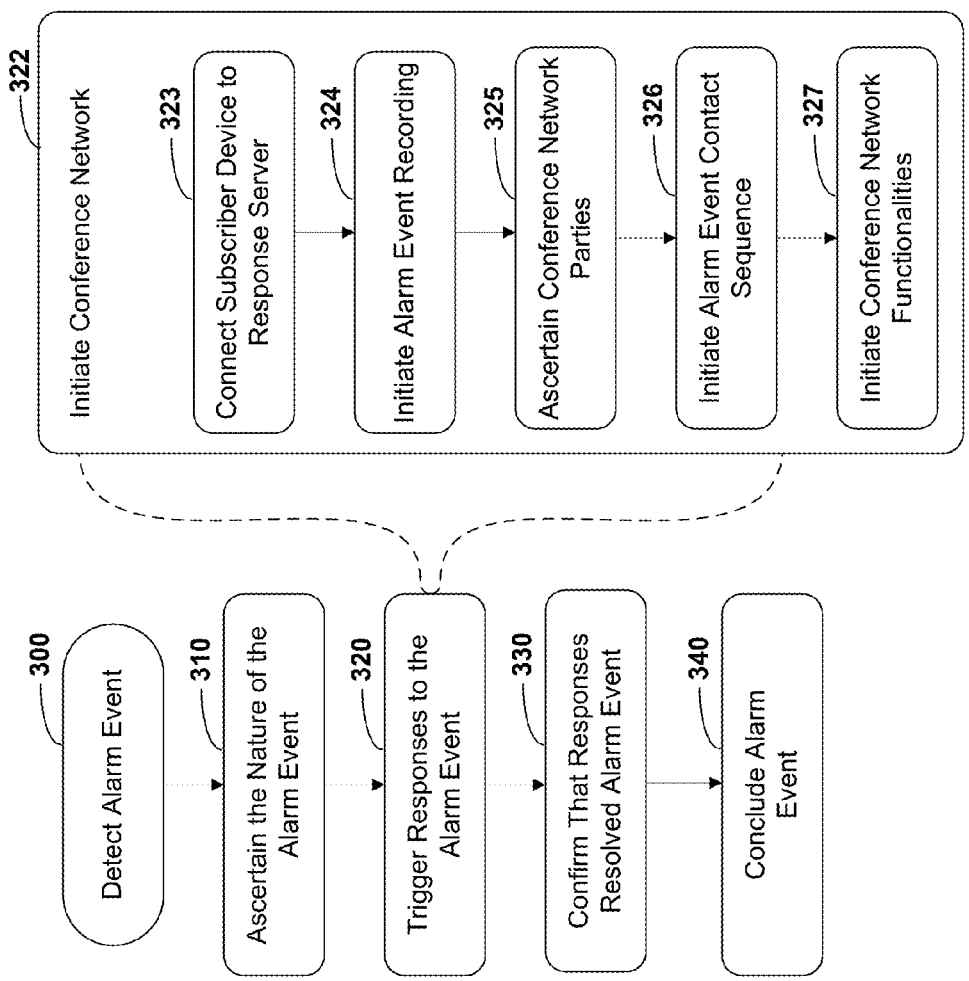
FIG. 3 shows a flow chart detailing one embodiment of a computer-implemented method for responding to a personal emergency response system alarm event.

FIG. 3 shows a flow chart detailing one embodiment of a computer-implemented method for responding to a personal emergency response system alarm event. Those skilled in the art will appreciate that numerous other embodiments of methods for responding to a personal emergency response system alarm event are within the spirit and scope of the disclosure herein.

As described in the embodiment shown in FIG. 3, upon having detected an alarm event 300, the personal emergency response system ascertains the nature of the alarm event 310, then triggers one or more response to the alarm event 320. The one or more responses may be triggered concurrently or in sequence, and may include, among other things, initiating a conference network, interacting with a subscriber device, interacting with an auxiliary device, or recording content associated with the alarm event. The embodiment described in FIG. 3 contemplates that the response to the alarm event is to initiate a conference network 322. As described in FIG. 3, the conference network may be initiated by connecting the subscriber device to the response server 323, and initiating alarm event recording 324. If the subscriber device is configured for continuous recording, the step of initiating alarm event recording 324 may be unnecessary. Next, the personal emergency response system ascertains the conference network parties 325, which are the parties to be given notice to join the conference network, and then the conference network contact sequence is initiated 326. Conference network functionalities are then initiated 327, which may comprise conference bridge commands, in-bound data commands, and out-bound data commands. Conference network functionalities may be accessible via a user interface. The interface may be a web-based interface or a telephone keypad interface such as a dual-tone multi-frequency signaling interface. After the conference network has been initiated, the embodiment described in FIG. 3 contemplates that the personal emergency response system then confirms that responses to the alarm event have resolved the alarm event 330, and if so, concludes the alarm event 340. In some embodiments, if the responses to the alarm event have not timely resolved the alarm event, the alarm event may be escalated, such as to emergency dispatch.

Figure 4:
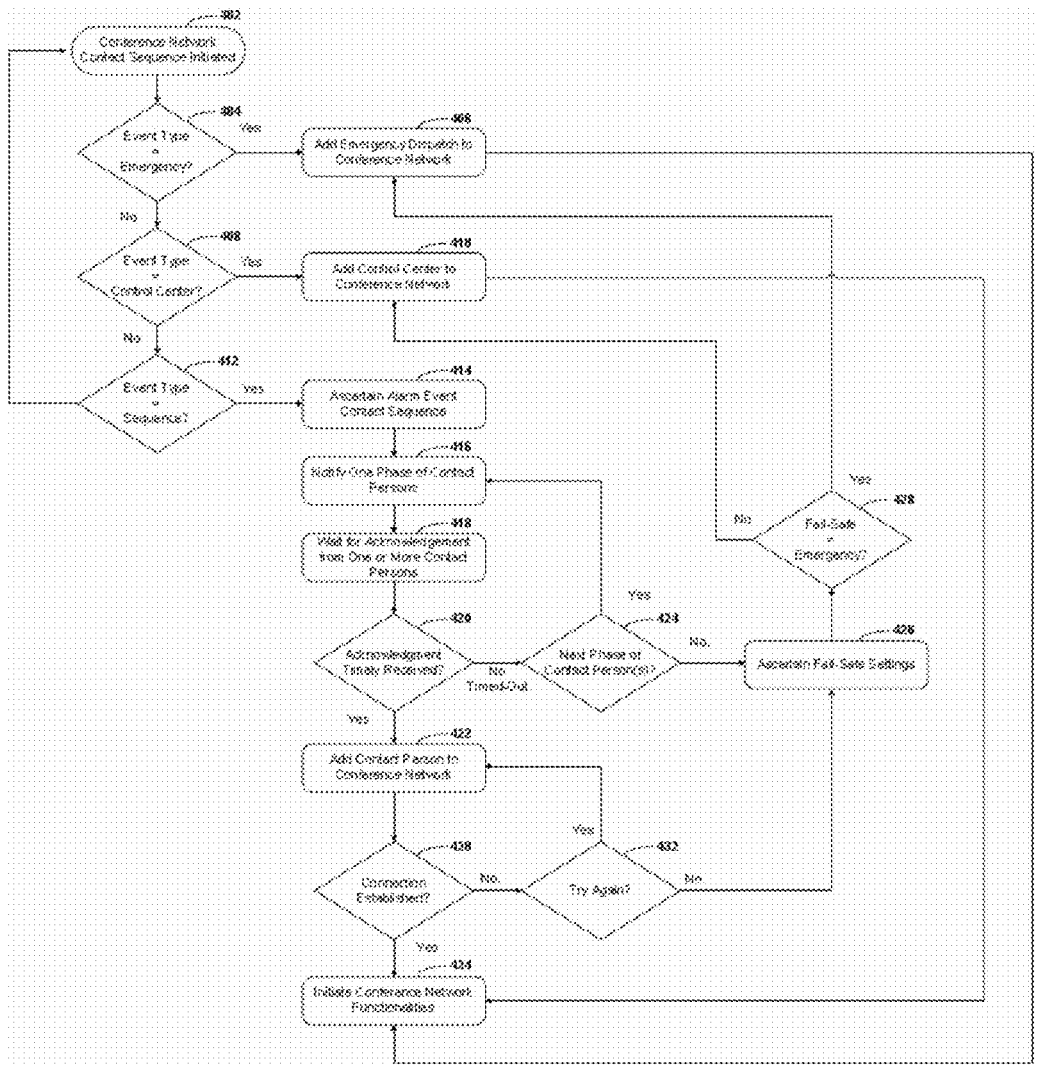
FIG. 4 shows a flow chart detailing one embodiment of a contact sequence for initiating a conference network.

FIG. 4 shows a flow chart detailing one embodiment of a contact sequence for initiating a conference network. As described in the embodiment shown in FIG. 4, upon the contact sequence having been initiated 402, if the alarm event type requires emergency dispatch 404, then emergency dispatch is added to the conference network 406. If the alarm event type requires a control center operator 408, then the control center is added to the conference network 410. If the alarm event type requires a contact sequence of one or more parties 412, then the personal emergency response system ascertains the alarm event contact sequence 414. Next, the personal emergency response system gives notice to one phase of contact persons 416, and then waits for acknowledgment from one or more contact persons 418. If acknowledgment is timely received 420, the one or more contact persons are added to the conference network 422. If acknowledgment is not timely received 420, then the personal emergency response system determines if there exists a next subsequent phase of contact persons 424, and if so, notifies such contact persons 418. This loop is repeated until one or more contact persons are added to the conference network 422, or all subsequent phases of contact persons have been exhausted.

If there are no subsequent phases of contact persons remaining to be contacted 424, then the personal emergency response system ascertains what fail-safe settings are in place 426. If the fail-safe settings provide for escalating the alarm event to emergency dispatch 428, then emergency dispatch is added to the conference network 406. Otherwise, the control center is added to the conference network 410.

When adding a party to the conference network, the personal emergency response system ascertains whether a connection has been established between the subscriber device and the party being added 430, and if so, access to the conference network functionalities is made available to such party or parties 432. If a connection between the subscriber device and the party being added has not been established, the personal emergency response system ascertains whether to attempt again to establish a connection 434, and if so, repeats the process of adding the party to the conference network 422. Otherwise, the personal emergency response system ascertains what fail-safe settings are in place 426 and proceeds appropriately.

Figure 5:
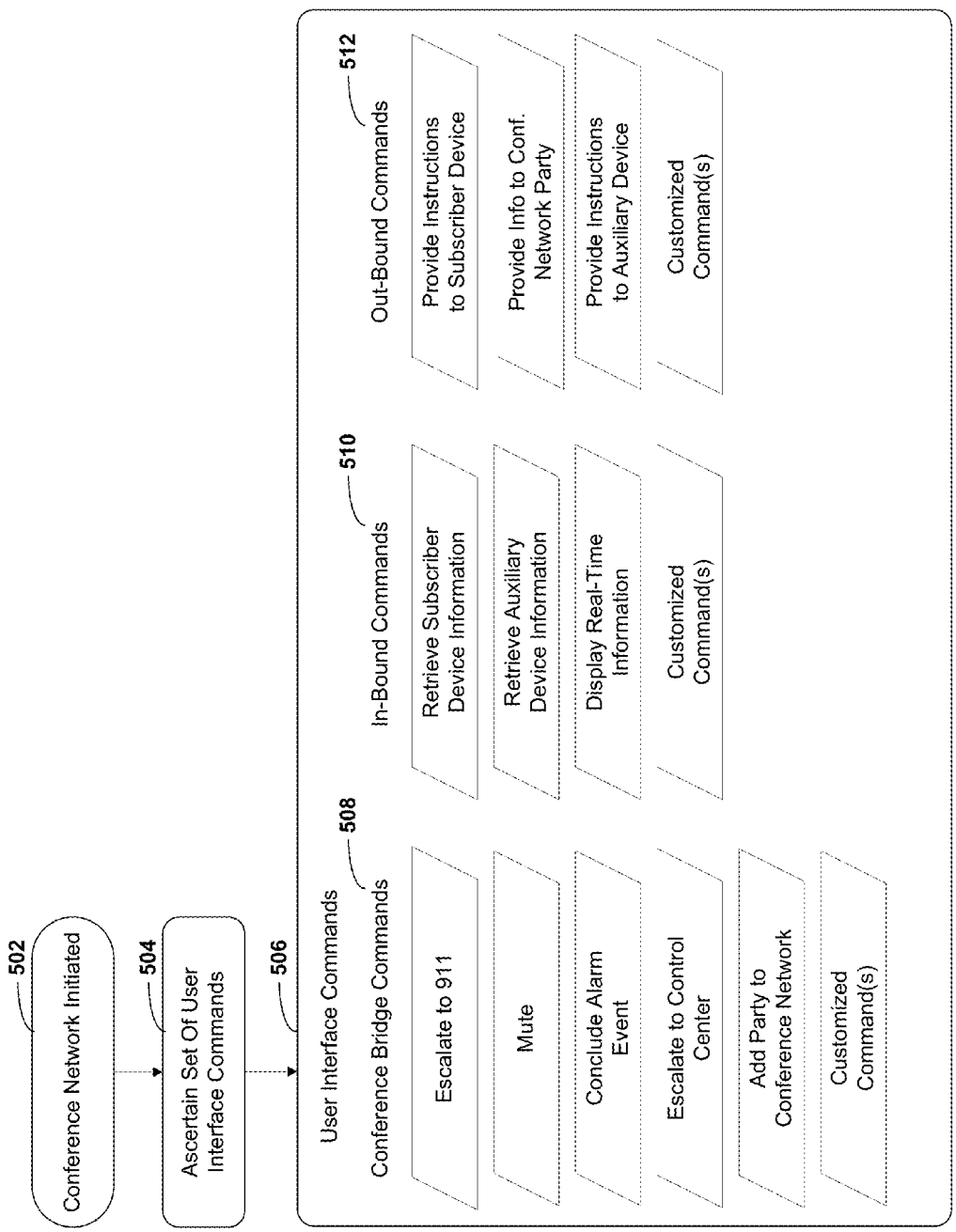
FIG. 5 shows a block diagram depicting one embodiment of user interface commands availed to users of one embodiment of a personal emergency response system.

FIG. 5 shows a block diagram depicting one embodiment of user interface commands availed to users of one embodiment of a personal emergency response system. Those skilled in the art will appreciate that numerous other embodiments of user interface commands and associated user interfaces are within the spirit and scope of the disclosure herein. FIG. 5 depicts a set of user interface commands that are made available to parties to a conference network. Upon the conference network having been initiated 502, the personal emergency response system ascertains the set of user interface commands to be made available to parties to the conference network 504, and then the appropriate set of user interface commands is made available to the parties to the conference network 506. In the embodiment described in FIG. 5, the user interface commands comprise conference bridge commands 508, in-bound commands 510, and out-bound commands 512. The conference bridge commands 508 include escalating to emergency dispatch, mute, conclude alarm event, escalate to control center, add party to conference network, and may also include one or more customized commands. The in-bound commands 510 include retrieve subscriber device information, retrieve auxiliary device information, display real-time information, and may also include one or more customized commands. The out-bound commands 512 include provide instructions to subscriber device, provide info to a conference network party, provide instructions to an auxiliary device, and may also include one or more customized commands.

Figure 6:
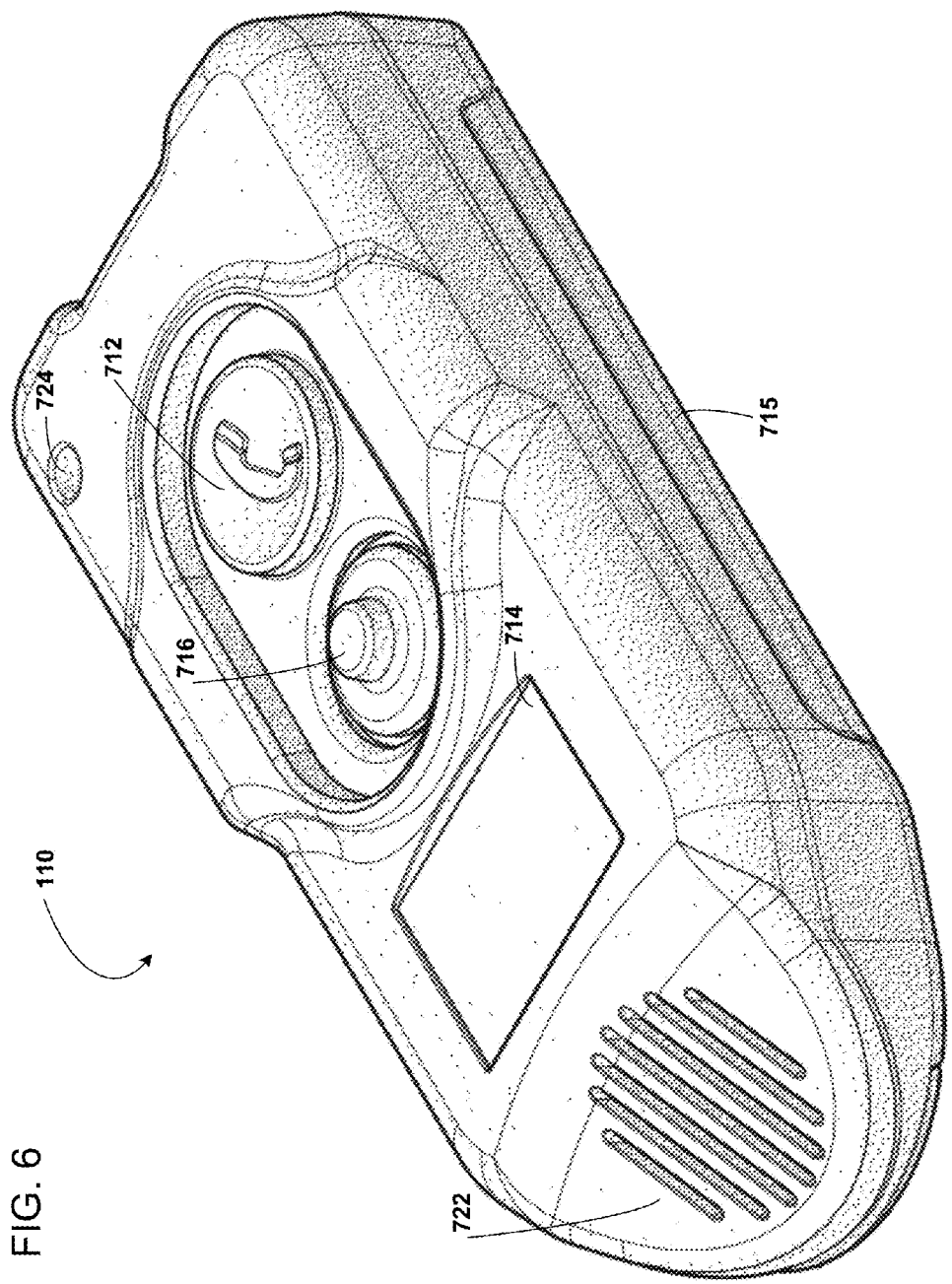
FIG. 6 shows an isometric view of an exemplary subscriber device.

FIG. 6 shows an isometric view of an exemplary subscriber device 110. The subscriber device is configured to interact with the personal emergency response system 100, for example. The subscriber device may alternatively or in addition to interact with other emergency response systems, for example, systems monitored by a central control center; systems requiring a subscription; systems operating without a subscription; systems monitored by a central monitoring station; systems enabling connections to family members, neighbors, or local emergency responders; and/or systems comprising a PSAP (public safety answering point) or more than one PSAPs. The subscriber device may, in some embodiments, be alternatively or in addition to the subscriber device described herein one or more of a fall alert button or an MPERS (mobile personal emergency response system). In different embodiments the subscriber device may be one or more of a personal mobile communications device, a mobile cellular device, a mobile PCS device, or other mobile transmitter.

In an embodiment, a housing of the subscriber device 110 includes an aperture through which a lanyard may be threaded such that the subscriber device may be worn around the neck of the user as a pendant. In a different embodiment, the subscriber device may be configured such that it may be worn as a wristband. In other embodiments, the subscriber device may be a thin device which may be kept in a pants pocket, shirt pocket, or jacket pocket, or clipped to a belt, or stored in a purse.

In an embodiment, the subscriber device 110 includes an alert button 712; one or more displays, such as display 714; a joystick/select button 716; one or more speakers, such as the speaker 722; and/or one or more microphones, such as the microphone 724. The alert button may be a portion of a user interface module of the subscriber device, the alert button being configured to respond to a press of the alert button by initiating one or more transmissions to an automated personal emergency response system, such as but not limited to the personal emergency response system 100 described elsewhere herein. The alert button may be configured to respond to a press of the alert button by initiating one or more cellular transmissions to a single telephone number associated with the automated personal response system so as to, for example, begin two-way communications and/or data transmissions among one or more parties and the subscriber device via the one or more cellular transmissions. In different embodiments, the user interface may have other, additional buttons with different buttons configured to trigger different alarm events. The subscriber device may also include an on/off button. The subscriber device could also include individual buttons for auto-dialing particular telephone numbers. For example, a first button of the subscriber device could be enabled for auto-dialing an emergency number such as 911, while a second button could be enabled for auto-dialing medical personnel such as a doctor or nurse of the user, and a third button could be enabled for auto-dialing a family member or other caretaker. However, in some embodiments a plurality of buttons may be undesirable and/or confusing to a user such that the optimum deployment of buttons is limited to an alert button and/or a joystick/select button.

Figure 9:
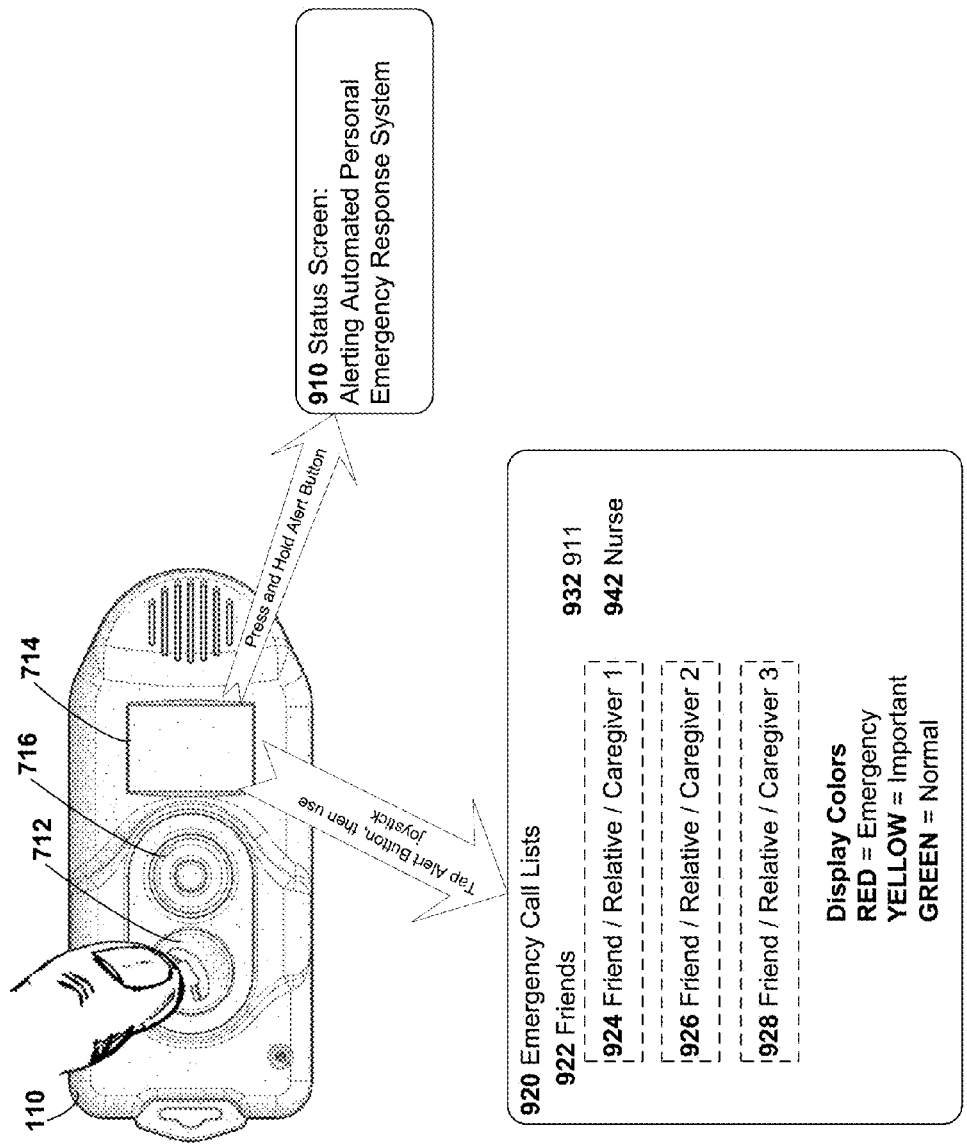
FIG. 9 shows a block diagram depicting a different embodiment of user interface commands availed to users of the exemplary subscriber device.

In some embodiments of the subscriber device 110, one or more displays, such as display 714, comprise a portion of the user interface module. The display may be a color display and may additionally be an OLED display. The color display provides a range of functionality in a variety of operational modes of the subscriber device. In a non-limiting example of an operating mode of the subscriber device, the color display may present a menu structure to a user of the subscriber device. In a different operating mode of the subscriber device, the color display may be used strictly to display large arrows which utilize the entire display to provide highly-visible directional and/or navigational guidance to a user of the subscriber device. The color display could alternatively display an arrow and a distance in the navigational guidance mode, the distance being to the next turn or to the destination. The colors of the display could be organized to relate to an urgency status of the various messages. For example, as shown in FIG. 9, "Emergency" messages could be displayed in red, while "Important" messages could be shown in yellow and messages with a "Normal" urgency could be shown in Green. Different display fonts and sizes for text prompts and status messages may also be facilitated via the display. The display may be configured to enable tactile or touch-screen interactions with various menu options. The vibrator motor 790 may be engaged to provide tactile interaction upon a virtual button of the display being pressed. Video conferencing may also be enabled via the display.

In some embodiments of the subscriber device 110, one or more controls, such as the joystick/select button 716, are present. The joystick may provide a replacement for four arrow keys of a keyboard and enable a user to navigate a menu structure by pressing the joystick in each of four ordinal directions to provide selection input of up, down, left and right. The joystick may also be depressed downward (i.e. towards the center of the unit rather than to one of the sides) to provide a select functionality.

In particular embodiments, the alert button 712 and the joystick/select button 716 are provided with a rubber gasket on the outside of the alert button and joystick/select button, the rubber gasket in communication with the housing of the subscriber device 110 to ensure water, moisture or foreign objects do not enter the subscriber device and ensuring the subscriber device retains a water-resistant character.

The subscriber device 110 may also include one or more speakers, such as the speaker 722. Speakers may be included in the user interface module or the audio module of the subscriber device. A speaker in the subscriber device may have a volume that is user configurable, such as by a menu presented to the user of the subscriber device on the display 714 in which the menu options are chosen via the joystick/select button 716. In some embodiments, the speaker volume may have a volume of at least 100 decibels ensuring that audio originating from a speaker of the subscriber device may be adequately heard by a user of the subscriber device. Particularly, the speaker volume may be set remotely, for example, by a party to a two-way communication including the subscriber device. For example, during a two-way communication initiated by the user pressing the alert button 112 (or initiated in some other manner, such as by a remote user), a party included in the two-way communication (such as a teleconference) may use a star command to set the volume on the subscriber device, overriding a volume setting which has been set by the user of the subscriber device (i.e. a party joined telephonically may press DTMF keys on the telephone, for example "*8", to control and/or maximize the volume of speaker output of the subscriber device, overriding any lower volume setting performed by the user). In certain embodiments, the subscriber device may include a plurality of speakers.

The subscriber device 110 may also include one or more microphones, such as the microphone 724. Microphones may be included in the user interface module or the audio module of the subscriber device. A microphone in the subscriber device may facilitate user interaction with the device and/or transmit the speech of the user to the two-way communications initiated in response to the alert button press. Further, the subscriber device may be configured so that, in an alternative to the user pressing the alert button, the user may voice a command to the subscriber device. For example, the subscriber device may be further enabled with voice recognition (in the audio module, e.g.) whereby the user may shout "Help!" which, when detected by the subscriber device via a microphone of the subscriber device, causes the subscriber device to initiate the one or more transmissions to the automated personal emergency response system. In different modes, the plurality of speakers and/or plurality of microphones may be combined with digital signal processing techniques to, for example, assist with shaping the audio stream and/or detection of speech by the user which might include performing noise reduction, removing background noise, detecting ambient noise, or performing other functions which may better be realized via a plurality of microphones and/or speakers in the subscriber device. This could even include estimating a distance and direction of the user of the subscriber device from the subscriber device itself, which information could be transmitted via the two-way communications and enable parties to the teleconference and/or emergency responders to know the location of the user relative to the subscriber device.

At least one speaker 722 and at least one microphone 724 of the subscriber device 110 are configured to facilitate communications between a user of the subscriber device and at least some parties joined to a teleconference established by the automated personal emergency response system in response to a press of the alert button 712 on the subscriber device. Upon a user of the subscriber device (or other individual) pressing and holding the alert button of the subscriber device, two-way communications (which may include a teleconference established by a cloud-based conference bridge of the personal emergency response system) may be established with the subscriber device and its user(s) comprising one "party" to the teleconference and other parties being joined to the conference via operations described elsewhere within this application. The subscriber device thus operates as a speakerphone in which the speaker and the microphone are engaged to facilitate aural communication between the user(s) of the subscriber device and other parties to the two-way communication. Using one or more display(s) 714 for the two-way communication transforms the speakerphone to a videoconference terminal. One or more image sensors may be provided in the subscriber device, the image sensor(s) providing an image capture capability so that images of the user of the subscriber device may be provided to the videoconference.

Also depicted in FIG. 6 is that the subscriber device 110 may have an access door 715. Opening the access door may reveal a compartment for a battery or other portable power supply for the subscriber device. The subscriber device may be provided with two batteries and an external battery charger. In this manner, a first battery may be powering the subscriber device while a second battery is charging. A caretaker or other person may change the batteries for the user of the subscriber device by opening the access door, removing a first, at-least-partially-depleted battery and replacing the first battery with a second, more fully charged battery. A bridge battery may keep volatile storage within the subscriber device energized during the battery replacement (i.e. first-to-second main battery replacement) process, such that a reboot process of the subscriber device is not necessitated by swapping batteries. A USB port (not visible in FIG. 6) may be behind the access door, or be otherwise accessible on the housing of the subscriber device. The USB port may include charging of an internal battery of the subscriber device and/or could facilitate programming/configuration of the subscriber device. The USB port may, for example, be used in lieu of or in addition to the web dashboard to facilitate all programming and/or reporting of the subscriber device which is available via the web dashboard.

Figure 7:
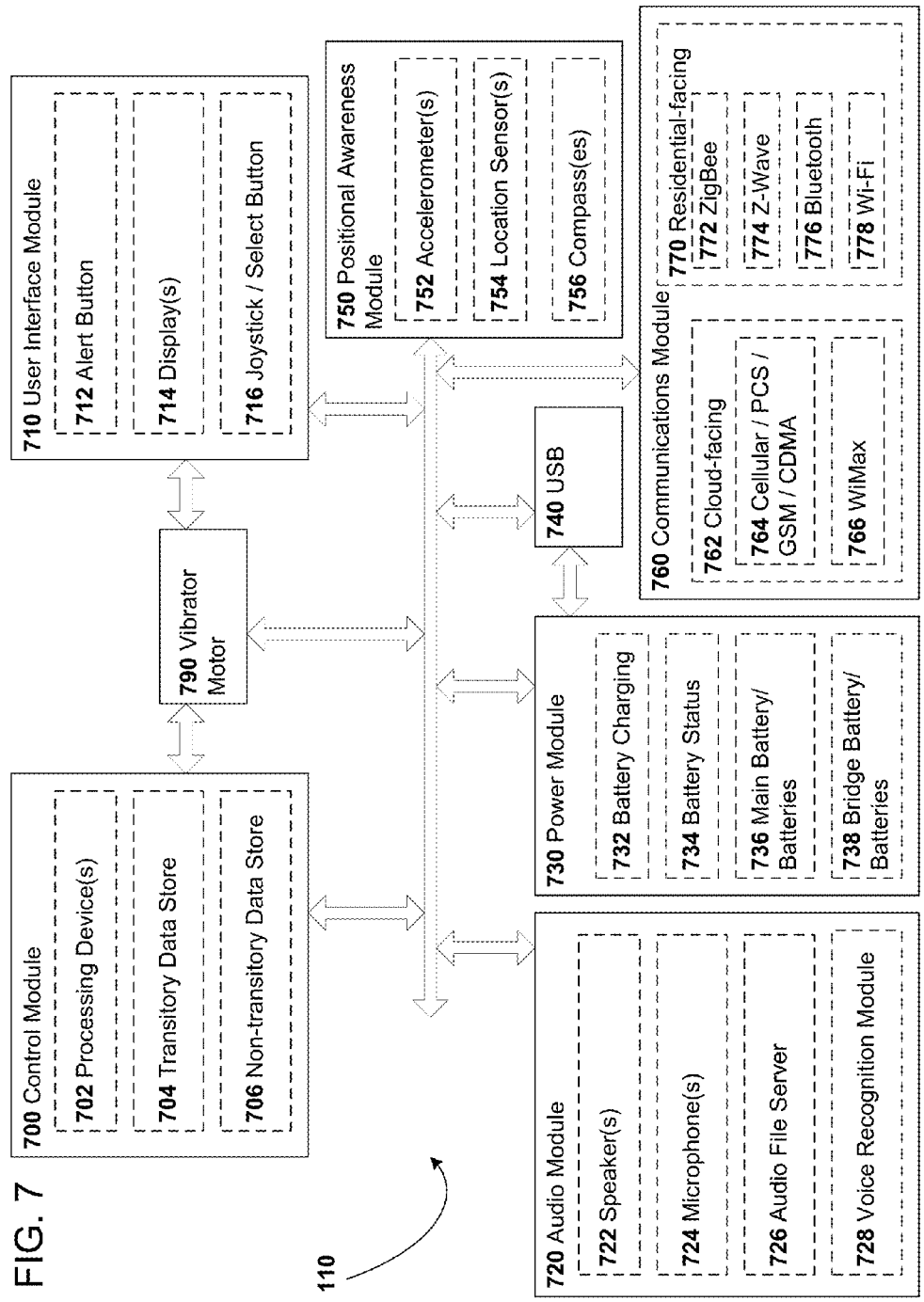
FIG. 7 shows a block diagram detailing circuitry and/or hardware aspects of an exemplary subscriber device.

FIG. 7 shows a block diagram detailing circuitry and/or hardware aspects of an exemplary subscriber device 110. In some embodiments, a subscriber device comprises an article of manufacture including at least a user interface module 710; a communications module 760; an audio module 720; a positional awareness module 750; a control module 700; and a power module 730. The foregoing modules may communicate with one another via a system bus of the subscriber device. Other aspects of the subscriber device may include a vibrator motor 790 and one or more USB connections 740. The vibrator motor may in some embodiments be coupled with the user interface module; the USB connections may be partially resident, interface with and/or in communication with one of the other modules. For example, USB interfaces may be present within a battery cavity exposed by the access door 715 and/or be accessible via the housing of the subscriber device.

Control module 700 may include one or more processing devices 702, such as, for example, a microprocessor. A transitory data store 704 may be present, including a memory which may be RAM, SRAM, EDO-RAM, or any other type of random access memory. A non-transitory data store 706 may be present, including ROM, Flash EPROM, a solid state hard disk, a magnetic rotating hard disk, or any other type of storage which retains its configuration when power is not applied to the storage. The non-transitory data store may include one or more instructions encoded as operations that may be performed by the subscriber device and/or configuration information for the subscriber device. As described elsewhere herein, such configuration information may be entered via a web dashboard and transmitted to the subscriber device, including telephone numbers to be dialed, information particular to the user of the subscriber device, etc.

The user interface module 710 may include an alert button 712, one or more displays 714, and/or a joystick/select button 716. Other elements of the subscriber device 110 may optionally be implemented as a portion of the user interface module. In some embodiments, audio functionality may be included in the user interface module; alternatively, it may also be resident in audio module 720. Other user interface aspects may also be present, such as additional buttons for on/off or additional one-touch auto-dialer buttons. In certain embodiments, the user interface may be limited to only the alert button and the joystick/select button to reduce the number of buttons on the device and make the device operation less confusing for users of the subscriber device. Operation of the foregoing aspects of the user interface module has been described elsewhere herein with relation to FIG. 6 inter alia.

The audio module 720 may include one or more speakers 722, one or more microphones 724, an audio file server 726, and/or a voice recognition module 728. Operation of the one or more speakers, the one or more microphones, and the voice recognition module of the audio module has been described elsewhere herein with relation to FIG. 6 inter alia. An audio file server is present to present aural prompts to the user of the subscriber device 110. For example, the subscriber device may speak the words "Dialing" or "Time to take your medication" or "Out of network service area". Storing these voice prompts on the subscriber device, perhaps using the non-transitory data store 706, and serving them using the audio file server is advantageous over merely blinking a light indicating a code. Additionally, the audio file server ensures aural prompts may be given by the subscriber device even should the subscriber device be out of wireless range.

The power module 730 may include battery charging logic 732, battery status logic 734, one or more main batteries 736 and one or more bridge batteries 738. In some embodiments, the subscriber device 110 may be powered by one or more main batteries which are removable from the unit via the access door 715. Batteries may be charged in some embodiments while in the unit, perhaps via USB port 740. However, it is anticipated that the subscriber device will be on the person of the user at all times, and that requiring the subscriber device to be coupled with a wall charger would be impractical in some situations as it would either require the user to be adjacent to the wall charger during charging, or require the user to divest the device during a charging period. Therefore, even though battery charging logic may be present in the unit, it is envisioned that this would receive secondary use, e.g. during initial charging prior to giving the unit to the user or in other similar situations. Battery status logic is present in order for the subscriber device to be able to report a current state of the battery (i.e. how much of the battery life has drained and how much remains). Reporting of the current battery state may be provided on the status/info screen 830, via the two-way communications, or to the web dashboard perhaps using the "Retrieve Subscriber Device Information" portion of the in-bound commands 510 described with relation to FIG. 5 inter alia. Operation of the one or more bridge batteries of the power module has been described elsewhere herein with relation to FIG. 6 inter alia.

The positional awareness module 750 may include one or more accelerometers 752, one or more location sensors 754, and/or one or more compasses 756. Accelerometers in the subscriber device 110 may aid in fall detection or may be used to determine orientation of the device. Importantly, the accelerometer(s) differentiate between a fall and the device (when provided as a pendant) merely swinging normally around the users neck when the user walks while wearing the pendant. Detecting a fall of the user of the subscriber device may include detecting a severity of the fall, generating information which may be used by the device to determine a particular alarm event as described elsewhere herein. The accelerometer(s) may also be used to determine an orientation of the device which, in conjunction with a measurement of the amount of time the device is in a particular orientation, may be used to determine a different alarm event. For example, if the accelerometer detects a sudden fall with the device remaining in a horizontal position for a long period of time, the device may request confirmation from the user that the user is okay via the user interface module, and if the device does not receive such confirmation it will automatically initiate the two-way communications with the personal emergency response system. In some embodiments, the fall sensors may be disabled for a period or permanently, as some users may want only the home automation, medical telematics, and/or user-initiated emergency response features without the fall sensor being able to initiate an emergency call automatically. The one or more location sensors may include GPS, GLONASS, triangulation with cellular towers or any other means of sensing a location of the subscriber device. Location may be used to provide navigation or guidance to the user of the subscriber device. For example, a user may use the user interface to choose "Home" as a desired destination, and the location sensors may be used to determine a current location and provide, perhaps in conjunction with navigation logic and/or one or more accelerometers of the device, directions including a large arrow on the display. One or more compasses of the device may be used to assist in navigational guidance, display headings to the user or utilize the headings for guidance in addition to or instead of the accelerometers/location sensors. Alternatively, the location sensors may be used in a situation in which the user of the subscriber device is lost or disoriented and cannot be located. Using the web dashboard, a caretaker can get the current location of the subscriber device and dispatch aid to that location. Or, in a situation where the user initiates an emergency two-way communication via pressing the alert button (or where the device independently determines an emergency exists and initiates the two-way communication), the current location detected by location sensors of the subscriber device may be transmitted to other parties on the communication so that emergency responders can be sent to the exact location. A destination may be provided via the web dashboard, so that an operator at the web dashboard can assist the user with a return to a particular destination.

The communications module 760 may include a plurality of wireless communications connections having varying ranges and functionality. Generally, the wireless connections may be divided into cloud-facing 762 (i.e. long range) and residential-facing 770 (i.e. short range). However, the descriptions "cloud-facing", "residential-facing", "short range", and "long range" are intended as non-limiting descriptions only, and should not be construed to mean that a particular connection may only be used to establish communications with a destination at a particular distance. For example, while the subscriber device 110 may be equipped with both a Wi-Fi and a cellular connection, either may be used for any type of communication within a residence irrespective of any designation herein of "cloud-facing" or "residential facing". An operator at the web dashboard may connect to the subscriber device in a user's home via either the cellular connection or via Wi-Fi using a Wi-Fi router in the user's home. A plurality of antennas is included in the subscriber device to support the various wireless connections as appropriate.

In some embodiments, the cloud-facing connections 762 may include a cellular connection 764, including at least one of PCS, GSM or CDMA. The subscriber device 110 may include circuitry which enables the device to transmit and receive on either (i.e. toggle between) GSM or CDMA, the selection being a configuration choice which may be made at the subscriber device or via the web dashboard. The subscriber device may also utilize circuitry which is limited to a particular number of pre-programmed numbers in hardware for cellular connections. This may be advantageous for reasons of cost control of production of the subscriber device. For example, the subscriber device may utilize a cellular chip (e.g. a cellular telephone chipset from Qualcomm, Gemalto or other provider) which is capable of dialing any telephone number. However, by hardware-limiting the quantity of telephone numbers which may be stored simultaneously, the license fee for the cellular chip may be lowered. Accordingly, the subscriber device may be provisioned with circuitry that limits the quantity of numbers which may be stored and auto-dialed to three to leverage the lower license fee from the provider of the cellular chip. (For the purposes of the patent claims of this patent application and any related patent application, the foregoing expressly represents a "negative limitation" which may be a portion of a patent claim presented either with the application as filed or in a claim amendment.) Once a two-way communication with the personal emergency response system is established, additional parties may then be added telephonically, enabling contact with more than three numbers via the conference bridge but still enabling the lower cost license for the subscriber device to be leveraged. In addition to or alternatively, the cloud-facing portion of the subscriber device may include a WiMax connection 766. Other cloud-facing connections are envisioned for the subscriber device including HSPA+, LTE, Flash-OFDM, iBurst, EDGE (and EDGE Evolution), UMTS, EV-DO, and others.

In some embodiments, the residential-facing connections 770 may include connections for ZigBee 772, Z-Wave 774, Bluetooth 776 and/or Wi-Fi 778. Other residential-facing connections are envisioned for the subscriber device including near field communication (NFC), RFID, and others. Some or all of the residential-facing connections provide data communications with medical telematics devices in the home. For example, machines which detect vital signs of the user of the subscriber device 110 and/or environmental factors within the home can be in communication with the subscriber device so that such data may be transmitted via the two-way communications with the personal emergency response system and/or to the web dashboard. Such medical devices may include, but are not limited to, heart rate monitors, waveform monitors, blood glucose monitors, oximeters, dosimeters, pacemakers, etc. Additionally, some or all of the residential-facing connections provide data communications with home automation devices in the home, including, but not limited to, alarm systems, automatic door locks, automatic outlets, and climate control systems and devices. The subscriber device can, independently or upon receiving a command from the web dashboard or the personal emergency response system, turn on a light or unlock a door. This may be advantageous in a scenario where the user of the subscriber device has unexpectedly fallen. The subscriber device may automatically and independently initiate a contact with the personal emergency response system. When public safety responders come to the home, the front door may be unlocked automatically via a home automation device receiving a command sent by the subscriber device via a residential-facing connection. For example, a Schlage or Kwikset front door lock with a Z-Wave connection installed at the front door may be sent an instruction by the subscriber device to unlock the front door so that emergency responders may enter the home even though the user is incapacitated. The subscriber device may be configured (perhaps via the web dashboard) to automatically unlock the front door via the Z-Wave connection any time it automatically initiates an alert to the personal emergency response system. Alternatively, a party to the teleconference initiated by the subscriber device may use a star command (e.g. "*7" to unlock the door) to enable access to the home and the user by EMS technicians dispatched to render aid to the user of the subscriber device.

Figure 8:
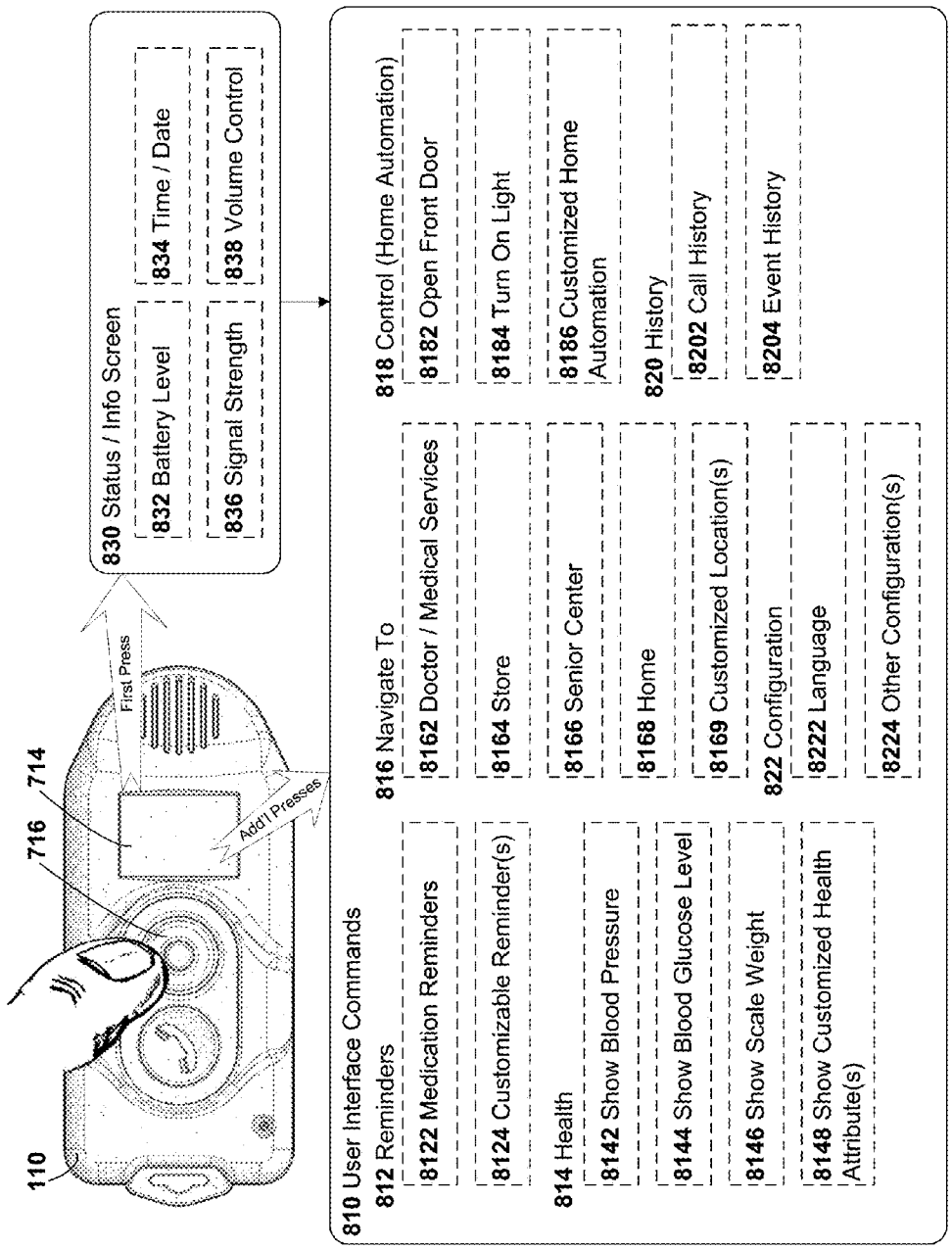
FIG. 8 shows a block diagram depicting one embodiment of user interface commands availed to users of the exemplary subscriber device.

FIG. 8 shows a block diagram depicting one embodiment of user interface commands availed to users of the exemplary subscriber device 110. Upon the user pressing the joystick/status button 716, a status/info screen 830 will be displayed on the display 714. The status/info screen may provide such information as a battery level 832, a current time and/or date 834, one or more signal strengths 836 relating to some or all of the wireless connections of the subscriber device, and/or a volume control 838. By manipulating the four-way joystick, the user may navigate through various operations of the subscriber device via a menu 810 of the user interface. The subscriber device may be configured to provide reminders 812 of particular events, for example, medication reminders 8122 at particular times or other customizable reminders 8124. Reminders may be programmed either via the subscriber device itself or via the web dashboard. At a prescribed reminder time, the user may be alerted via a visual signal on the color display, a tactile alert (i.e. the vibrator motor 790 shakes the device to get the attention of the user), and/or an aural signal (i.e. the subscriber device will intone "Time to take your medicine" via the audio file server). Importantly, the reminder schedule is stored within the non-transitory data store 706 of the subscriber device and reminders will continue to be given even if the subscriber device is out of range of any cloud-facing wireless connections. Reminders may be configured so that acknowledgements by the user are required (i.e. upon being alerted to take medicine, the user is required to acknowledge taking the medicine). The acknowledgement may be communicated to the web dashboard, stored in the data warehouse, or otherwise acted upon. Alternatively, or in addition to the foregoing, lack of an acknowledgement may generate an alert. Other reminders may be reminders regarding meals and/or appointments, among others.

The subscriber device 110 may be configured to display various health-related metrics 814 in response to selection via the menu 810 of the user interface and manipulation by the user of the four-way joystick 716. For example, the device may be commanded to "Show Blood Pressure" at 8142, "Show Blood Glucose Level" at 8144, "Show Scale Weight" at 8146, and/or show other customized health attributes(s) at 8148. Upon the user commanding the device to show one of the foregoing health-related metrics, the device may use a residential-facing connection described above to interrogate a particular medical telematics device. For example, upon being commanded to "Show Scale Weight", the device may communicate with a FitBit scale equipped with Wi-Fi to receive a recent weight measurement when the user last stepped on the scale. Current blood glucose readings may be sensed from a wearable biosensor, e.g. the Symphony tCGM wireless blood glucose monitor. Blood pressure may be sensed from wireless-equipped measuring systems from Welch Allyn, for example. A heart rate may be displayed via the subscriber device wirelessly connecting with a heart rate monitor (HRM) worn by the user, the HRM in wireless communication with the subscriber device using Bluetooth, 5 kHz or other type of connection. Any other types of medical and/or health metrics may be sensed via wireless connections in the subscriber device and displayed via the user interface. These measurements may also be transmitted to the personal emergency response system, stored in the data warehouse, and/or provided to the web dashboard, all in accordance with disclosures elsewhere herein.

The subscriber device 110 may be configured to display navigation and/or directional guidance information 816 in response to selection via the menu 810 of the user interface and manipulation by the user of the four-way joystick 716. For example, the device may be commanded to provide navigation and/or directional guidance to a "Doctor/Medical Services" at 8162, a "Store" at 8164, a "Senior Center" at 8166, the users "Home" at 8168 and/or provide navigation and/or directional guidance to other customized destination (s) at 8169. Navigation and/or directional guidance information may then be presented to the user with the user interface module 710 and/or the positional awareness module 750 and including techniques and/or operations disclosed elsewhere herein in relation to FIG. 7 inter alia.

The subscriber device 110 may be configured to control home automation devices 818 and/or perform various home automation tasks in response to selection via the menu 810 of the user interface and manipulation by the user of the four-way joystick 716. For example, the device may be commanded to "Open Front Door" at 8182, "Turn On Light" at 8184, and/or perform other customized home automation tasks at 8186. Home automation tasks may be performed and home automation devices may be controlled with the user interface module 710 and/or the communications module 760 and including techniques and/or operations disclosed elsewhere herein in relation to FIG. 7 inter alia.

The subscriber device 110 may be configured to interact with a history 820 of the device in response to selection via the menu 810 of the user interface and manipulation by the user of the four-way joystick 716. For example, the device may be commanded to show "Call History" at 8202, or to show "Event History" at 8204. Other commands related to the history may be performed via the user interface, including saving the history, uploading it to the data warehouse, and or perform other history-related tasks disclosed elsewhere herein.

The subscriber device 110 may be configured to perform configuration 822 of the device in response to selection via the menu 810 of the user interface and manipulation by the user of the four-way joystick 716. For example, a language setting 8222 for the device may be chosen. Other configuration options 8224 as appropriate for the subscriber device may also be chosen via the configuration menu. Configuration options may also be set via the web dashboard.

FIG. 9 shows a block diagram depicting a different embodiment of user interface commands availed to users of the exemplary subscriber device 110.

In an embodiment, upon the user pressing and holding the alert button 712, the subscriber device 110 will initiate one or more cellular transmissions to the personal emergency response system, in order for a teleconference to be established including two-way communications between parties to the teleconference and the subscriber device (and its user) using methods, hardware and/or operations disclosed elsewhere herein. A status screen 910 may be shown on the display 714 upon the alert button being held down, the status screen informing the user that the subscriber device is "Alerting Automated Personal Emergency Response System", or another suitable status message.

Upon the user pressing and releasing the alert button 712, an "Emergency Call List" screen 920 will be displayed on the display 714. In some embodiments, the number of pre-programmed telephone numbers for a phone call from the subscriber device 110 may be limited to no more than three, as discussed elsewhere herein. In different embodiments, a menu may be presented to the user for automatically dialing particular phone numbers. For example, the menu may include an option for "Friends" at 922, "911" at 932, and/or a "Nurse" at 942. The Friends menu may have options including "Friend/Relative/Caregiver 1" at 924, "Friend/Relative/Caregiver 2" at 926, and "Friend/Relative/Caregiver 3" at 928. The foregoing menu options may be selected using the joystick/select button 716. As discussed in relation to FIG. 6, the display may show messages and/or prompts in different colors (including perhaps red, yellow or green) to relate different levels of urgency to the messages or prompts.

Figure 10:
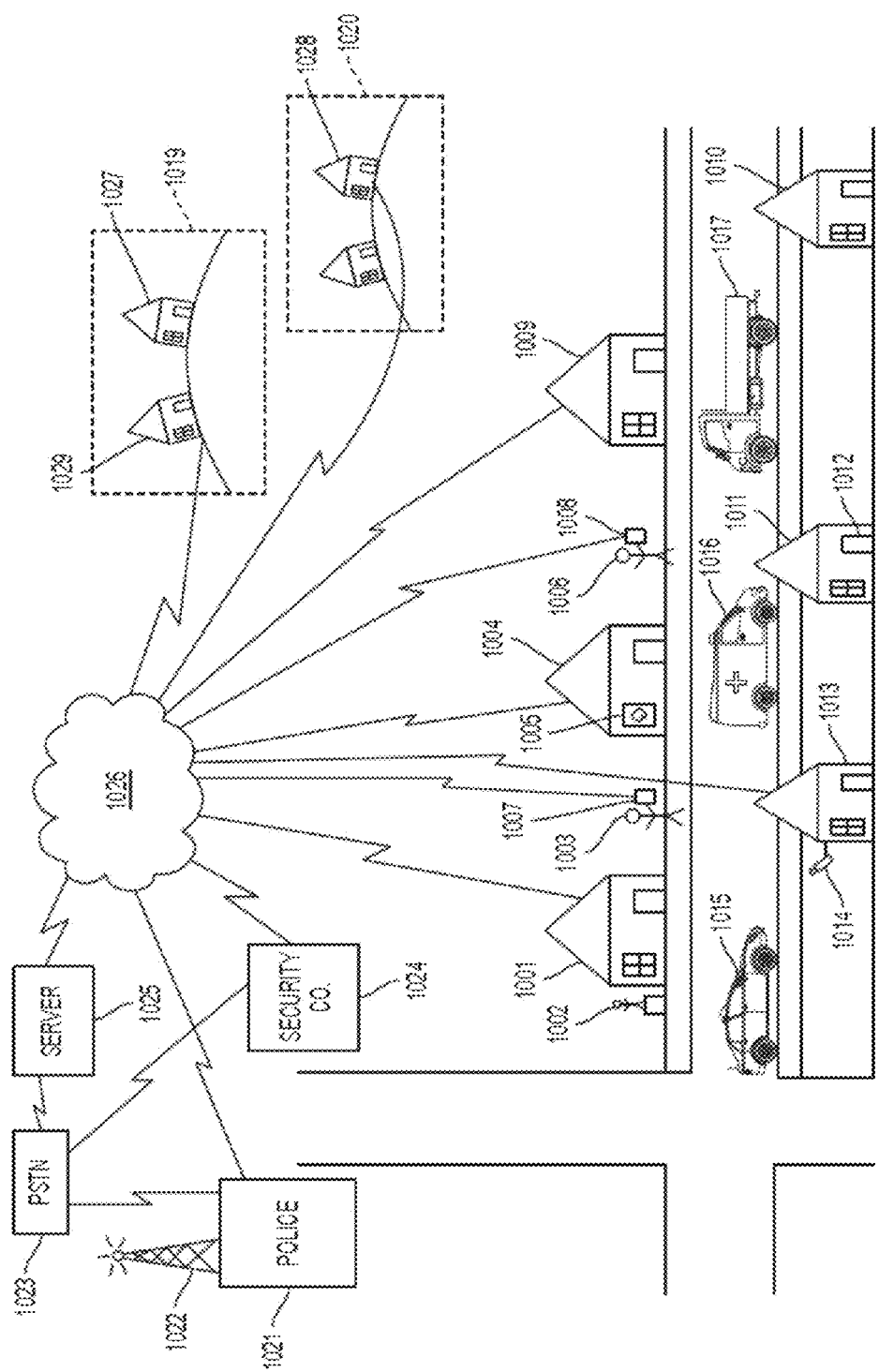
FIG. 10 is an environmental view of a community emergency response system, in accordance with an embodiment of the invention.

FIG. 10 is an environmental view of a community emergency response system, in accordance with an embodiment of the invention. In some embodiments, the community emergency response system may generally facilitate communications between home-based alarm systems with mobile devices owned by subscribers to replace a central monitoring center (e.g. ADT™ or another alarm company).

The community emergency response system is managed by a community emergency response server 1025, with connections to the internet cloud 1026 and to the public switched telephone network ("PSTN") 1023. Of course, as disclosed elsewhere herein, the nomenclature "community emergency response server" is a non-limiting term and does not imply a single computer acting as a server. "Server" as used herein may include a single system, mirrored systems, load-balanced systems, fault-tolerant systems, distributed systems, one or more server farms, a server configuration where functions are spread among systems e.g. a front-end host, a back-end database server, one or more application layers spread among multiple servers, an application or application layer leveraging a wireless network, social network, or search network, etc. In some embodiments, the community emergency response server is, or is an adjunct to, the personal emergency response system disclosed elsewhere herein. In different embodiments, the community emergency response server is disparate from the personal emergency response system disclosed elsewhere herein.

FIG. 10 depicts a neighborhood including some houses which are coupled with the community emergency response server ("CERS"), some houses which are monitored by a legacy alarm company, and some houses which do not have alarm systems and are unmonitored. House 1001, for example, is coupled to the CERS. A burglar 1002 is attempting to gain unauthorized and forcible entry to house 1001. House 1001 may have an alarm system, in which a window sensor, movement sensor, audio sensor, or other similar detection device may be triggered responsive to detection of an unauthorized entry into the house. Alternatively, house 1001 may have a keypad or panic button which may be pressed by an occupant who requires help in response to the break-in by burglar 1002.

The alarm system at house 1001 may be installed by an operator of the CERS, and configured for connection via the internet or the PSTN to the CERS. Alternatively, the alarm system at house 1001 may have originally been installed by and connected to a legacy alarm company (e.g. ADT) for monitoring, but the homeowner may have switched to the CERS which uses a community-based model. The community-based model may result in less expensive subscriptions for said subscribers because most or all of the humans who respond to alarm events are other homeowners, volunteers, and/or members of the community rather than employees of an alarm company. In addition, false alarm events in which public safety (e.g. police, fire, ambulance) is notified can result in fines for an alarm company and/or for a subscriber. In the community-based model, if something harmless occurs like a window or garage door is inadvertently left open, a neighbor may be able to handle the issue rather than a fine-producing alarm event being generated to an alarm company and/or the public safety agency. (Industry statistics have shown that 98% of alarm events escalated to public safety from legacy alarm systems are false alarms, resulting only in excess police paperwork, less-than-optimally deployed public safety resources, and fines for homeowners and communities).

For example, returning to FIG. 10, a resident of house 1004 may have inadvertently forgotten to close a window 1005. An alarm system at house 1004 can communicate via the internet or via the PSTN with the CERS with data regarding the open window. The CERS can "push" a notification to one or more responders, including the homeowner or other responsible party (management company, tenant, etc.), a neighbor, and as a last resort a monitoring company 1024 or public safety agency 1021. The CERS may use escalation procedures similar to those disclosed elsewhere herein for the PERS (i.e. a fail-safe for escalating to emergency dispatch if community responders do not respond in an appropriate timeframe).

House 1009 may be an unalarmed home. However, residents of house 1009 may still be subscribers to the CERS system and have the ability to use a computing device to send requests for assistance via connections to the internet 1026 or the PSTN 1023. Separately, residents of house 1009 may be community monitors, such as community monitor 1006, even though house 1009 has no installed alarm system. A community monitor may periodically walk through the community and watching for problem conditions, such as open window 1005 at house 1004. Community monitor 1006 may have a mobile CERS app installed on a mobile device 1008, with access to the CERS server 1025 for communicating with other CERS subscribers, other community monitors, and/or emergency responders (e.g. alarm, public safety, etc.).

In some embodiments, community monitors are enrolled in groups of responders. The groups may be configured and stored at the CERS by community members. Certain community monitors may be designated as first-responders who will leave their own homes to walk or drive to a house at which an event is occurring. The mobile CERS app may facilitate communication among the different responders. For example, community monitor 1003 and community monitor 1006 may be members of a responding group that is pre-configured at the CERS server via a web-based dashboard. A third community monitor may also be a part of the responding group, but is not picture in FIG. 10 because the third community monitor may be on vacation or otherwise unavailable.

All three community monitors may receive a push notification from the CERS server regarding the break-in at house 1001 by burglar 1002, and via the mobile CERS app may communicate with one another in regards to the alarm event. For example, the third community monitor who is on vacation or otherwise unavailable may, in response to the alarm event, push a button on his or her mobile device which notifies the other monitors that he or she is on vacation out-of-state and unavailable. Separately, community monitor 1006 may already be checking house 1004 because of the open window 1005, and may use a text field to write that he or she is unavailable currently, but will come to house 1001 after looking over house 1004. The community monitors may be volunteers, private security 1017 hired for the community, or a mix of both. Priority groups may be established such that a volunteer is contacted first, then others are contacted if the first responder does not respond or needs additional assistance.

The CERS may be used to establish a chat session between all monitors, either mobile or desktop-based. The mobile CERS app may include a chat session window, and a browser-based interface may be available for others to join the chat. Quick-response buttons may be displayed alongside the chat session window, so that a particular monitor may press a button for a quick response status (e.g. "I'll Go Look", "I'm Unavailable", "Escalate To 911"). If one of the buttons is pressed, the status is communicated to all the community monitors via the chat window. A responding monitor can notify the others what is seen at the site of the home where the alarm was triggered and/or escalate to local public safety if deemed necessary (e.g. if a community monitor determines that an ongoing break-in is occurring, the police 1021 may be contacted and a policeman 1015 may be dispatched via the normal dispatching means 1022 of the police).

The mobile CERS app may leverage functionality of the mobile device on which it is running. For example, if one or more cameras are present in the mobile device, community monitor 1003 can push a button on the mobile CERS app to activate video capturing. Community monitor 1003 could then use the camera of mobile device 1007 (smartphone, tablet, dedicated device similar to that disclosed elsewhere herein) to produce still images or video of the break-in, events surrounding the break-in, or other relevant images/ video. The video may be sent in real-time via streaming to other subscribers, a monitoring company, and/or to public safety agencies. Separately, the video may be stored by the CERS or sent elsewhere for storage, so that it can be used for subsequent investigations and/or as evidence in a prosecution. Date and time stamping may be overlaid on the video, using the current date and time read from the mobile device. Audio may also be captured and could include the voice of the community responder. Alternatively, the audio could include voice conversations occurring in real-time as a part of conference calling established in response to the alarm event, similar to that disclosed elsewhere herein.

Video can also be captured by surveillance video systems installed at homes coupled with the CERS system. For example, house 1013 has a video surveillance system installed, which may include external video camera 1014. The media stream (video, audio, both) from any video camera component of the video surveillance system may be requested by and/or sent to the CERS server. The media stream, which may include an active event at the house with the system installed or in another location within the field of view of the house with the system installed, could be transmitted in real-time to others. For example, the media stream could be viewed by community monitors using the mobile CERS app. The media stream could also be viewed using the desktop app by remote users (homeowners, vacationers away from home, community monitors, or others).

Feedback regarding the video can be sent to the person capturing the video ("please zoom in on the window," "get video of the side yard," "we've got enough, you can stop," etc.). Remote control of the video can occur (i.e. a monitor zooming the camera in remotely using the camera app or controlling a home-based surveillance camera) and other chat users can command the capturing monitor to snap real-time high-resolution images while the data streaming is occurring.

The mobile CERS app may also use GPS functionality of the mobile device to transmit and/or store a location of the community monitor who is responding to an alarm event. Mapping software may be used, either as a mash-up with a third-party map provider (e.g. Google Maps™) or natively in the mobile CERS app, to provide the community monitor with directions to a particular home in the community where an event has been generated.

Returning to FIG. 10, an open front door 1012 at house 1011 may be seen by a community monitor, such as community monitor 1006, who is walking through the community. The community monitor may initiate an alert via the mobile CERS app on the community monitor's mobile device 1008, which might alert a homeowner of house 1011 and or trigger an escalation in which another community monitor or other responder (private security, public safety) is requested to investigate. Alternatively, the community monitor 1006 may decide to investigate, and the mobile CERS app may establish contact with the homeowner so that the community monitor and homeowner can confer via the app in real-time. If the homeowner is unable to be contacted, the community monitor may independently investigate, with the video function of the mobile CERS app making a video record of the community monitors intervention for storage in the cloud and later use, if needed.

House 1010 may be a home owned by a person without an internet connection and without any alarm monitoring. For example, the home may be owned by an elderly person who requires occasional personal care or assistance. A caregiver, which may include a family member, may reside in another neighborhood such at connected home 1028 within neighborhood 1020. If the caregiver knows or anticipates a problem with the elderly resident at house 1010, the caregiver may use a desktop interface to the CERS system or may use the mobile CERS app to trigger an event, resulting in a push notification asking a community monitor to go check on the elderly resident. In some embodiments, the home may have an internet connection and the caregiver may transmit commands via the CERS system to devices inside the home, such as a command to unlock a front door enabling a community monitor to enter. The chat window of the mobile CERS app would connect the community monitor and the caregiver. Buttons may be pressed by either the community monitor or the caregiver to dispatch additional help, such as ambulance 1016. Other methods disclosed elsewhere herein, such as establishing a conference call with healthcare personnel or other family members, may be implemented via the CERS system.

The community emergency response server 1025 may have the ability to monitor multiple communities, such as community 1019 with CERS connected home 1029 and unconnected home 1027 (which still benefits from having community monitors connected by CERS). In some embodiments, community 1019 may be completely unrelated to the community comprising houses 1001, 1004, 1009 etc. In different embodiments, the two communities may be operatively coupled by the community emergency response server so that communications relevant to an entire geographic area (the national emergency alert system, Amber alerts, local public safety advisories) may be transmitted to all CERS subscribers in the relevant geographic location irrespective of neighborhood.

Figure 11:
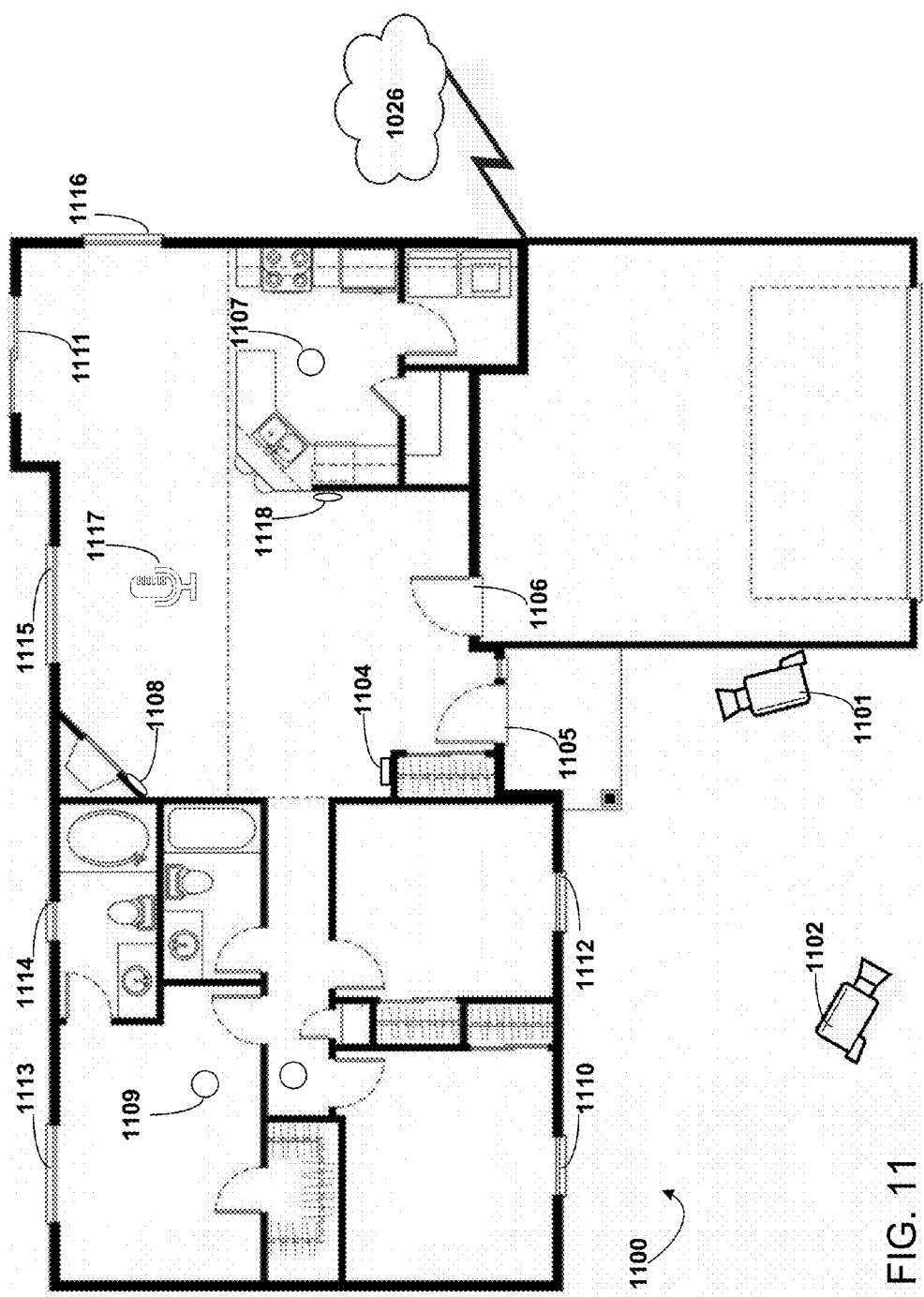
FIG. 11 is an environmental view depicting a floor plan of an exemplary CERS-monitored home.

FIG. 11 is an environmental view depicting a floor plan of a CERS-monitored home. The home is at 16001 234th St SE and the residents include John and Michael. The home has an internet connection via cloud 1026 to the CERS system. It is driven by alarm panel 1104, which has an emergency button which can be used by a resident or other occupant to generate an alarm event. The alarm panel has a number of zones. A zone may exist for door, window, panic button, camera, audio monitor, smoke detector, CO detector, motion detector, etc. FIG. 11 depicts windows which are monitored, either with wired or wireless sensors, including west bedroom window 1110, east bedroom window 1112, master bedroom window 1113, bathroom window 1114, family room window 1115, and dining room window 1116. Monitored doors include front door 1105, interior garage door 1106, and patio slider door 1111. A front door video camera 1101 is mounted to the outside of the house, and an exterior video camera with the driveway in the field of view is mounted as 1102. Smoke and/or CO detectors include kitchen detector 1107, fireplace detector 1108, master bedroom detector 1109, and hallway detector 1119. A motion detector 1118 and microphone/sound detector 1117 are present near the front door. Programmable alarm panel 1104 is used to set the alarm and is where an emergency button (panic button) is located. As discussed above, the foregoing components may have been previously installed by a legacy alarm company and monitored by that company prior to the homeowner enrolling with the CERS. In some instances, the existing alarm panel 1104 may be reprogrammed to contact the CERS rather than the legacy alarm company. In other instances, the alarm panel will be replaced with one that is compatible with the CERS, while other monitoring components (contact switches, cameras, etc.) may be re-used. In still other embodiments, the alarm system and all its components depicted in FIG. 11 may be newly installed for use with the CERS.

Figure 12:
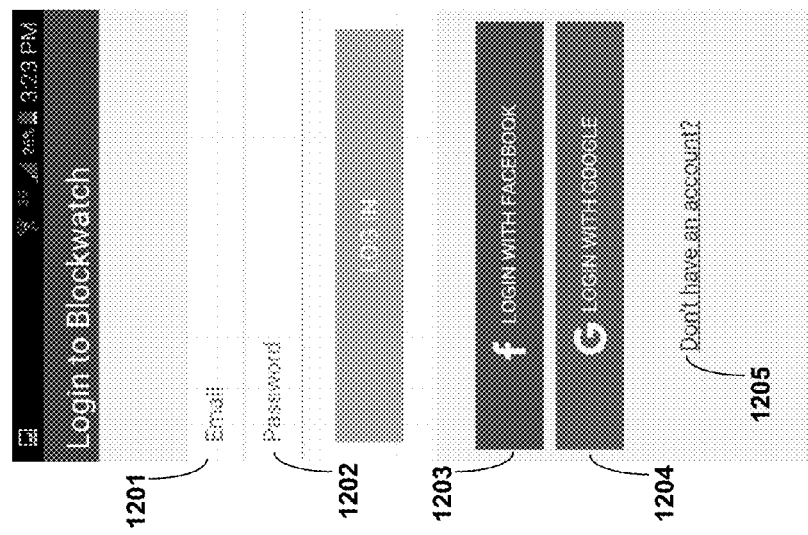
FIG. 12 shows a login screen for a mobile CERS app, in accordance with an embodiment of the invention.

FIG. 12 shows a login screen for a mobile CERS app, in accordance with an embodiment of the invention. A user account for a CERS system may be referenced by a CERS-unique login 1201 (which in some embodiments may be an email address, telephone number, or another unique identifier) and password 1202. In some embodiments, a login for a social network 1203 (which could be Facebook™ or another social network) or a login for a search engine 1204 (which could be Google™ or another social network) may be used. If the user does not have an account, the user may create an account using a link.

If the user does not have the mobile CERS app, it may be downloaded to the phone and installed (e.g. through the "Google Play" store). A user may also interface with the CERS system through a website in addition to, or instead of, through the mobile CERS app. It is envisioned that community monitors will use the mobile app in order to take advantage of the video recording features and/or chat in real-time with other users of the system while responding to an event. Further, users who want notification in regards to their own home while away from home will likely use the mobile app.

A user may be invited to the CERS system by an administrator, who can send a text message to the user's mobile device which includes a link to a website where a login can be created that is automatically associated with a particular home alarm system. Upon the user being enrolled in the CERS system, the user may upload an avatar and/or add contact methods including mobile and landline phone numbers. By default, the first user to be added is an admin user, with rights to change all settings with respect to the home alarm system and modify access rights for other users with respect to the home alarm system. The user can also invite an additional user to the system and/or configure notification preferences, described in more detail below.

Figure 13:
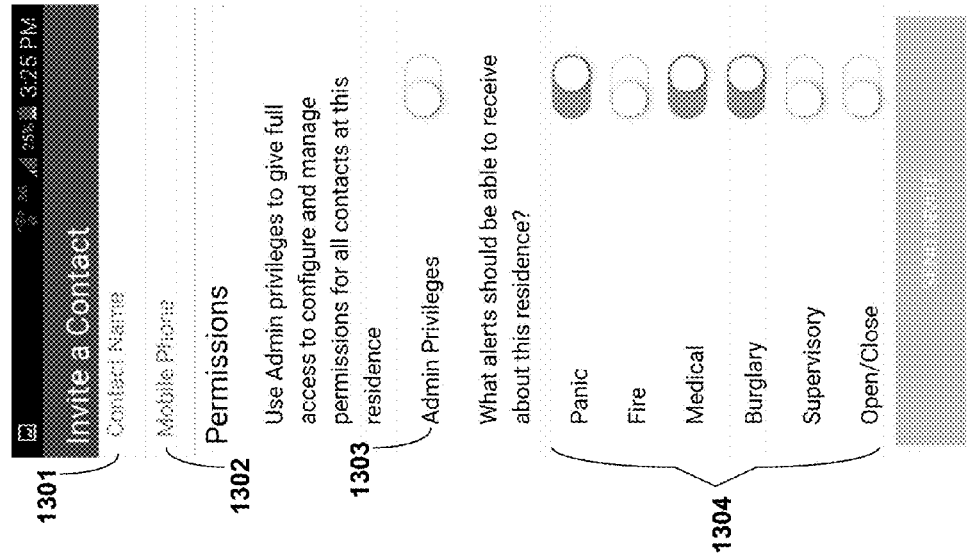
FIG. 13 shows a screen for inviting another contact to join the CERS, in accordance with an embodiment of the invention.

FIG. 13 shows a screen for inviting another contact to join the CERS, in accordance with an embodiment of the invention. In some embodiments, once a first user has enrolled as the admin user of the system, additional users may be invited as shown in FIG. 13. The new users contact information, including a contact name 1301 (which may be changed later by the new contact upon enrollment) and mobile number 1302, is entered. The new user may be designated as an admin user through the "Admin Privileges" slider switch 1303. Permissions to receive various types of alerts for the new user are designated via slider switches 1304. In this way, it may be seen that a user who is not a resident of the home may be set up as a monitor and receive alarm events generated by the system. For example, the new user may be set up to only receive emergency type of events such as panic, fire, medical, and/or burglary events, so as to not be contacted every time the alarm system registers someone entering or leaving the home. Of course, it is not necessary that other users be invited to be associated with a particular home. The system may be used strictly by a single occupant who wishes to be notified of events while the user of the system is away from home, and in such an instance only a single user account would be needed. Alternatively, users may be set up as contacts for multiple residences. For example, a user may be set up as an admin user for a home owned by that user, and be set up as a contact for a neighbors home which the user has agreed to watch while the neighbor is on vacation.

FIG. 14 shows a screen for setting notification preferences for a particular user. Notifications may be sent to users by email, by text message, by telephone call, or through some combination of those. In other embodiments, the system may be configured to not send a notification for a particular event type. Additionally, different methods of notification may be configured for different types of events. For example, as depicted in FIG. 14, the system may be configured to send email for events of the "Supervisory" type and send text messages ("mobile text") for the remaining event types. In addition, when the system detects an "Open/Close" event (e.g. someone coming through the front door), the system may identify the person (perhaps as the person who set or disabled the alarm, or perhaps by using biometric means to detect the person) and send a type of notification dependent upon which person generated the event. A housecleaner could be configured in the system, such that when the housecleaner enters or exits the home an email or text message is sent, but entry/exit events generated by others do not result in a message being sent at all.

FIG. 15 shows a screen for configuring a contact plan for a particular residence being monitored. For each event type (e.g. "Panic", "Fire" etc.) one or more users may be selected to receive alerts related to the event. The alert will be sent to the user via the method for the type of alert configured by that user with the screen depicted in FIG. 14. For example, if John Smith used the screen of FIG. 14 to instruct the system to send alerts via "mobile text" for the event type "Panic" 1401, if a panic event is generated a text message will be sent to John Smith's mobile device via the mobile number configured by the user on the screen depicted in FIG. 13.

FIG. 16 shows an activity screen which may be viewable on a mobile device using a mobile CERS app. At 1601, the top line would show a menu. As may be seen, the "Activity" menu item is selected and has the number of new alerts in a red circle. From this menu, a user may open a chat window, review residences for which the user is configured as a contact under "My Block" or in some embodiments "My Residence", or change settings (email address, notification communication means, phone number, name, etc.). At 1602, a new and unhandled alert is seen, stating that at 11:05 AM at the John Smith residence depicted in FIG. 11, an attempted burglary took place in which an unauthorized party attempted to gain entry to the west bedroom window 1110 of FIG. 11. A status flag of "Unhandled" is shown, meaning that no contact has yet looked into the alert and resolved it. "1 Comment" is also shown, meaning that a chat has been initiated relative to this alert and may be seen by selecting the alert.

At 1603, a resolved alert is shown for the John Smith residence, in which an attempt to gain entry to the same zone (west bedroom window) was made. After investigation, the alert was marked as resolved, perhaps because a responder went to the home and did not see a burglary taking place. At 1604, an alert showing that the alarm system was armed by the user Michael is shown. At 1605, an alert showing that the alarm system was disarmed by the user Michael is shown. The activity screen is scrollable such that flicking up or down will bring additional events into view.

FIG. 17 shows a status screen relating to an alert, and particularly, to the new and unhandled alert 1602 of FIG. 16. The address for the alert is shown at 1701. At 1702, a more detailed description of the alert is given, noting that the west bedroom window zone was violated while the system was armed. At 1703, the date and time of the alert are shown. At 1704, the number of users who received notifications (three) is listed, along with the number of users who have actually viewed the alert (one so far). At 1705, in the chat window ("Community Discussion"), a message is posted by user Steven Myhre who received the alert. In this example, Steven Myhre is not a resident, and may be a community monitor who receives alerts related to this residence. Steven posts a message asking "anyone home?" to determine if there is a homeowner or other resident present who can check the zone.

A text field is at 1706, where the user can contribute to discussion occurring in the chat window. As was disclosed previously with respect to FIG. 10, the community monitor, homeowner, and other parties can confer in real-time via the chat window. If the homeowner is not home, for example, the homeowner may post to the chat window that he or she is unable to check on the alarm. At 1707, a button may be pressed by users who receive the notification to quickly post that they are unavailable to assist. If all users post that they are unavailable, or nobody responds in a pre-defined amount of time, the system may automatically escalate the alert to other community members, a private security service, or public safety as programmed in the CERS. At 1708, a button may be pressed which automatically notifies 911. An entry for the residence and/or the community is present in the PSAP system so that the public safety agency receiving the 911 call will know the identity or location of the 911 caller as shown in the PSAP database.

At 1709, buttons are present for controlling video capture which, as disclosed previously with respect to FIG. 10, can be transmitted as a live feed from the mobile device to other community monitors, the homeowner, or to public safety. Feedback may be provided to the user capturing the video via the chat window (e.g. ("please zoom in on the window," "get video of the side yard," "we've got enough, you can stop," etc.). The video may be stored on the mobile device, at the CERS, or at another system for later use during an investigation or legal proceedings. At 1710, a "Mark As Resolved" button permits a responder to close the alert and facilitate notification to other community monitors or users of the system that someone has checked the home and no further action is needed.

Figure 18:
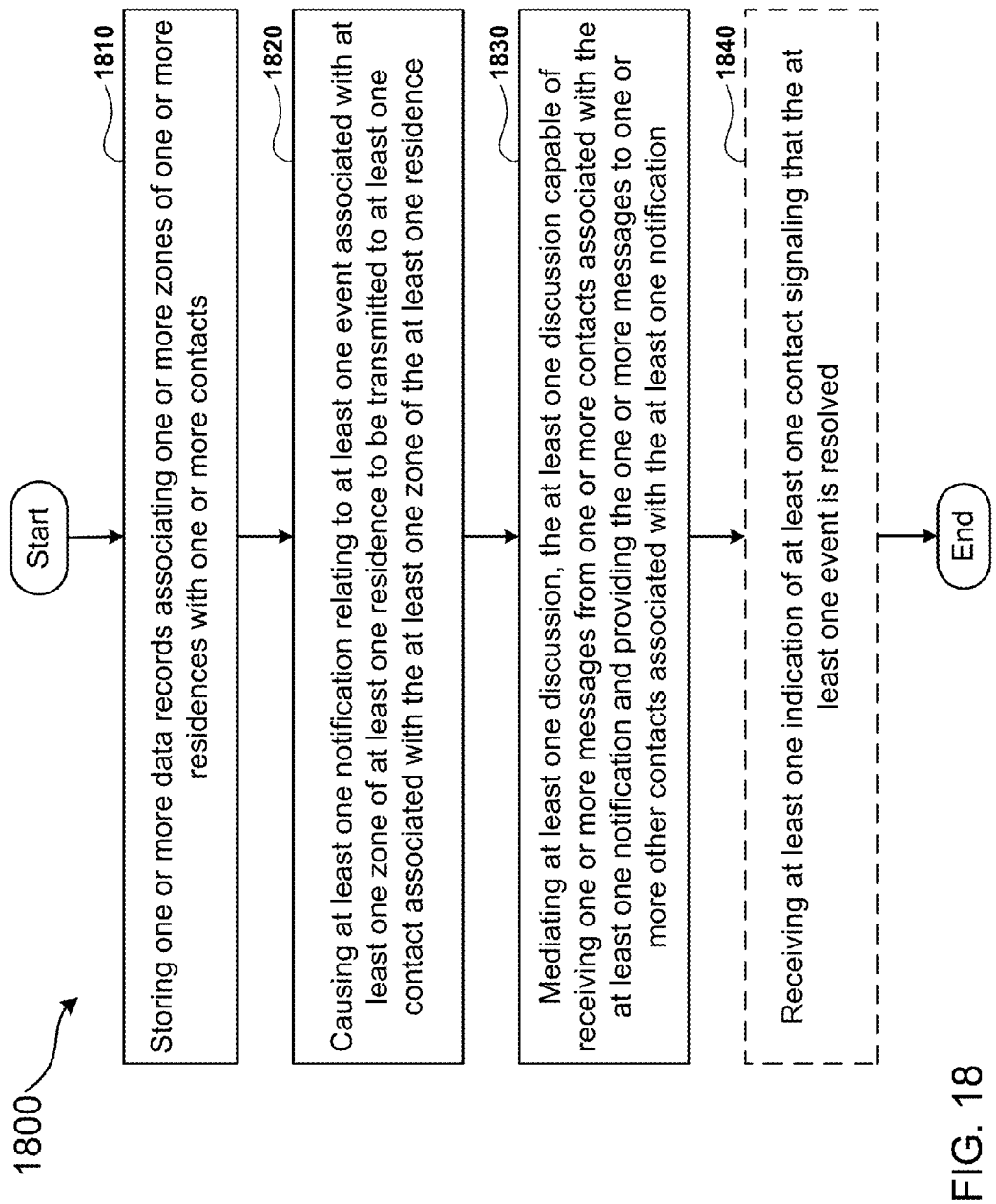
FIG. 18 illustrates a system and/or an operational flow 1800 representing example circuitry, means and/or operations related to a community emergency response system.

FIG. 18 illustrates a system and/or an operational flow 1800 representing example circuitry, means and/or operations related to a community emergency response system. In FIG. 18 and in following figures that include various examples of circuitry, means and/or operational flows, discussion and explanation may be provided with respect to the above-described examples of FIGS. 1 through 17, and/or with respect to other examples and contexts. However, it should be understood that the circuitry, means and/or operational flows may be executed in a number of other environments and contexts, and/or in modified versions of FIGS. 1 through 17. Also, although the various circuitry, means and/or operational flows are presented in the sequence(s) illustrated, it should be understood that the various procedures carried out by circuitry or means and/or the operational flows may be performed in other orders than those which are illustrated, or may be performed concurrently. "Operational flow" as used herein may include circuitry for carrying out the flow; hence, FIGS. 1 through 17 reference "circuitry configured for" performing a procedure. A processing device, such as a microprocessor, may, via execution of one or more instructions or other code-like appurtenances, become "circuitry configured for" a particular operation. An operational flow as carried out by a processing device would render the processing device "circuitry configured for" carrying out each operation via execution of the one or more instructions or other appurtenances.

After a start operation, the operational flow 1800 moves to operation 1810. Operation 1810 depicts storing one or more data records associating one or more zones of one or more residences with one or more contacts. For example, as shown in and/or described with respect to FIGS. 1 through 17, a community emergency response system may store configuration data in a data store operatively coupled with one or more computing devices accessible via the internet.

Configuration data may include data records associated with residences being monitored. As used herein, residences may include homes, houses, apartments, offices, warehouses, or other structures suitable for protection with alarm systems. The configuration data may include data records associated with zones within residences being monitored. As discussed elsewhere herein, a zone may be an abstraction identifying a contact switch for a door or window, a motion sensor, an audio sensor, a video camera, an optical sensor, an infrared sensor, a temperature sensor, a smoke detector, a carbon monoxide detector, a panic button, or other such appurtenance able to be operatively coupled with an alarm system.

Configuration data may include information related to contacts. A contact may be a homeowner, a resident, a neighbor, a caregiver, a family member, a caretaker, a housekeeper, a groundskeeper, an employee, a volunteer, a community monitor, a private security service, a public safety agency, a fail-safe alarm monitoring company, or another individual or entity with at least partial access to the residence and/or at least partial responsibility for maintaining security of the residence and/or responding to alerts or alarm conditions. The information related to contacts may include a name, mobile number, email address, residences for which the contact is designated, permissions, an indication of whether the contact is an administrative user, and/or other identifying or configuration information. A contact may be identified with a user name, an email address, or through a login via a social network account (e.g. a Facebook account) or a search engine account (e.g. a Google account).

The configuration data may include records associated with event types, which may associate particular zones with particular event types (e.g. associating a smoke detector with the fire event type, associating a panic button on an alarm panel with a panic event type, or associating a contact switch on a door or window with a burglary event type and/or an open/close event type). The configuration data may include records associated with a contact plan for one or more residences. That is, as depicted in FIG. 15, for particular event types (e.g. "panic" or "medical"), one or more contacts may be designated to receive notifications for such events. The configuration data may include records associating a particular contact with a particular notification type. For example, John Smith may receive email for open/close events, text messages for medical events, and email, mobile text, and mobile calls for panic events and fire events. A user may be designated to only receive notification of any type for certain event types and no notification for other event types (e.g. the user Michael receives mobile text messages for medical events, panic events, fire events, and burglary events, but does not receive any notification regarding open/close events). Also, a contact who is designated for more than one residence may receive information regarding different event types via different notification types at the differing residences (e.g. John Smith could receive notifications of all events irrespective of event type for his own residence, but only receive notifications relating to medical events for a different residence for which he is designated as a contact). Other types of configuration data may also be stored in data records via operation 1810.

Then, operation 1820 depicts causing at least one notification relating to at least one event associated with at least one zone of at least one residence to be transmitted to at least one contact associated in the at least one data store with the at least one zone of the at least one residence. For example, as shown in and/or described with respect to FIGS. 1 through 17, and particularly with respect to FIGS. 10 and 11, the consumer emergency response system 1025 may receive a signal transmitted via the internet 1026 from an alarm panel 1104 installed at the residence at 16001 234th St SE (ref. 1001 of FIG. 10), the floor plan for which is depicted in FIG. 11. The signal may include an indication of a zone, for example, zone 1110, the "west bedroom window" zone. A type of event may be determined. For example, the type of the event (burglary, for example) may be sent by the alarm panel. Alternatively, the community emergency response system may receive a signal indicative of the west bedroom window opening, and based upon a previous arming of the alarm system determine that a burglary is occurring (where the event type would be merely an open/close event type if the alarm system was not armed when the event arrived). The community emergency response system may determine one or more contacts associated with the 234th St residence, including John Smith, for notification of the at least one event, and may determine how to contact John Smith (email, text message, voice call to cell phone, voice call to landline) based on configuration information associating John Smith and events of the particular type (burglary). The community emergency response system may then cause notifications to be sent via the different notification types (e.g. send John Smith a text message notifying him of a burglary at the 234th St residence taking place in the west bedroom window zone).

Then, operation 1830 depicts mediating at least one discussion, the at least one discussion capable of receiving one or more messages from one or more contacts associated with the at least one notification and providing the one or more messages to one or more other contacts associated with the at least one notification. For example, as shown in and/or described with respect to FIGS. 1 through 17, and particularly FIGS. 16 and 17, contacts accessing the community emergency response system via a mobile CERS app on their mobile devices (smartphone, tablet, dedicated device e.g. FIG. 9) or via an internet browser using a laptop, desktop, or other similar system, may see an activity screen as depicted in FIG. 16 showing events associated with the 234th St residence of John Smith, and at the top may be a listing 1602 showing the burglary at the west bedroom window occurring today at 11:05 am. Upon selecting (e.g. tapping, clicking on, etc.) the top listing, the contact may be shown a burglary alert screen as depicted in FIG. 17. A chat window will be displayed (e.g. under "Community Discussion"). The community emergency response system will mediate the chat associated with this particular event by receiving incoming messages from particular contacts (e.g. "Anyone home?" from Steven Myhre) and rebroadcasting them to other contacts so that the contacts can communicate in real-time in regards to the event.

Operation 1840 depicts an optional operation of receiving at least one indication of at least one contact signaling that the at least one event is resolved. For example, as shown in and/or described with respect to FIGS. 1 through 17, and particularly FIGS. 16 and 17, a "Mark As Resolved" button 1710 is present in the chat window, which will send a signal to the community emergency response system to remove the "Unhandled" flag shown in FIG. 16, stop any timers counting up in order to determine whether the event should be escalated, remove any banners from activity logs signifying a new event, or other action to be pushed to the mobile CERS app clients or desktop web clients as appropriate.

Subsequent to operation 1830 and/or 1840, the operational flow 1800 moves to an end operation.

Figure 19:
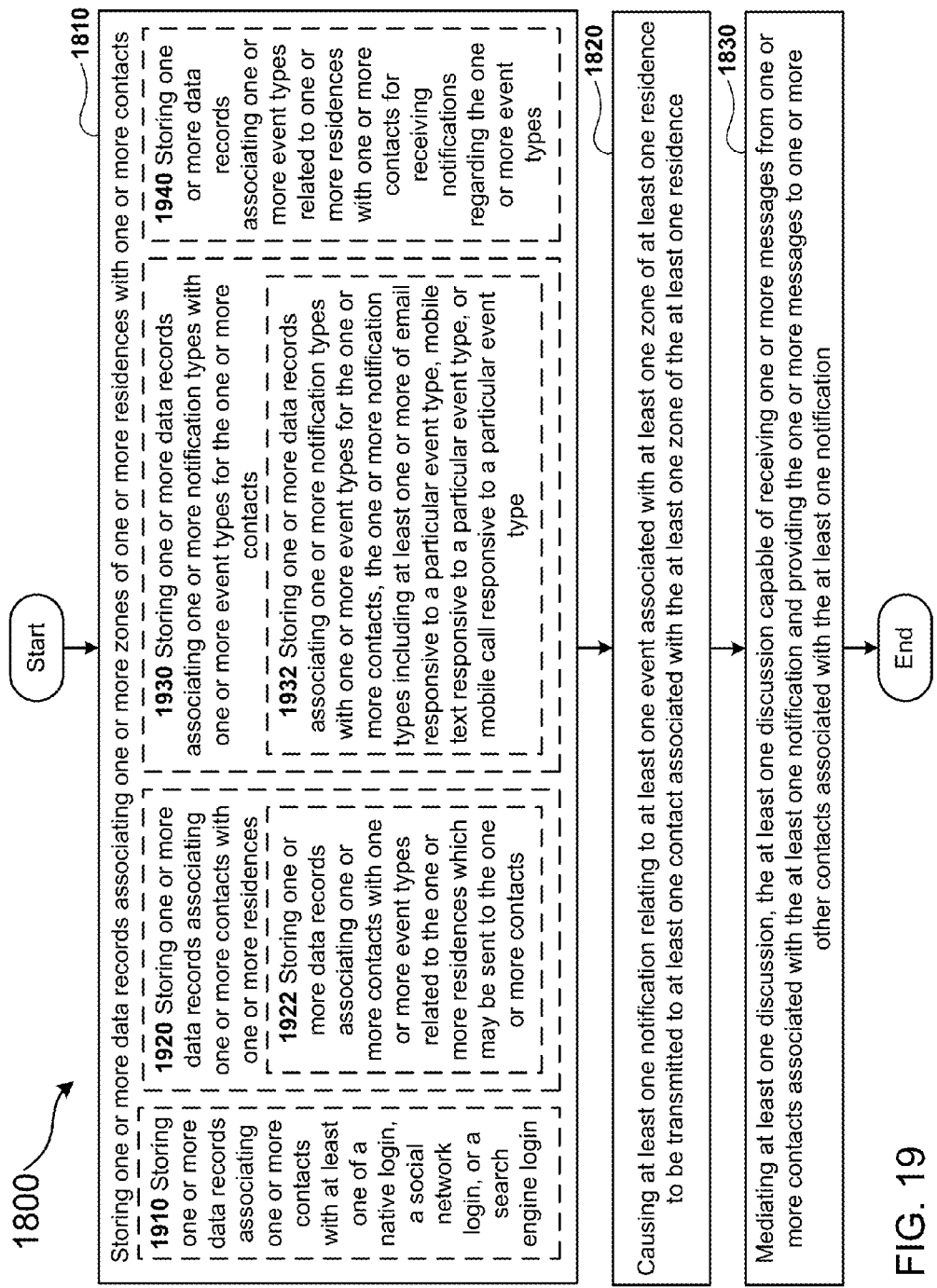
FIGS. 19-22 illustrate alternative embodiments of the example operational flow 1800 of FIG. 18.

FIG. 19 illustrates alternative embodiments of the example operational flow 1800 of FIG. 18. FIG. 19 illustrates an example embodiment where operational flow 1810 may include at least one additional operation. Additional operations may include operation 1910, 1920, 1922, 1930, 1932, and/or 1940.

Operation 1910 illustrates storing one or more data records associating one or more contacts with at least one of a native login, a social network login, or a search engine login. For example, as shown in and/or described with respect to FIGS. 1 through 17, and particularly with respect to FIG. 12, a contact may log into the system using the contact's primary email address, or another email address in use by the contact. Alternatively, the community emergency response system may be integrated with a third-party authentication system such as a social network authentication system or a search engine authentication system. Rather than create a user account for use with the community emergency response system, requiring the user to recall another password, the system may offer a login using a Facebook or Google account, for example. Accordingly, if the user is already logged into Facebook or Google (for example, if the user is using an Android phone and is identified by the phone via a Google account), the user may elect to utilize that account login with the community emergency response system in a single sign-on fashion.

Operation 1920 illustrates storing one or more data records associating one or more contacts with one or more residences. For example, as shown in and/or described with respect to FIGS. 1 through 17, a contact may be associated with one or more residences. For example, a contact named John Smith may be associated with the home he owns at 16001 234th St and for which he is subscribed to the community emergency response system (eschewing a legacy alarm monitoring company). The home at 16001 234th St may have other individuals associated with it in the community emergency response system, which may include contacts receiving notifications for particular alarm events at that address and/or contacts who have their own alarm code for the system to record entries and exists and/or arming and disarming of the alarm system. Further, John Smith may also be listed as a contact for other residences. He may be a community monitor and be listed as a contact for a neighbors house. John Smith may also be a caregiver for an elderly parent residing in another neighborhood altogether and receive text messages should the elderly parent press the panic button on an alarm panel at his or her residence.

Operation 1920 may include at least one additional operation, which is operation 1922. Operation 1922 illustrates storing one or more data records associating one or more contacts with one or more event types related to the one or more residences which may be sent to the one or more contacts. For example, as shown in and/or described with respect to FIGS. 1 through 17, and particularly with respect to FIG. 13, it may be that a contact elects to receive notifications of certain event types but not others. John Smith may wish to receive notification of all event types (burglary, fire, supervisor, open/close) related to his own residence. Michael, a resident of the home at 16001 234th St, may only be designated to receive notifications of certain "emergency" event types (burglary, fire, panic) but not "ordinary" event types (open/close), for example. Alternatively or additionally, John Smith may wish to receive notification of only certain event types at the home of his elderly parent. For example, while John may want notifications for all events at his own home, for his parent's home John may elect to receive notifications of the certain "emergency" event types (burglary, fire, panic) but not "ordinary" event types (open/close), for example.

Operation 1930 illustrates storing one or more data records associating one or more notification types with one or more event types for the one or more contacts. For example, as shown in and/or described with respect to FIGS. 1 through 17, and particularly with respect to FIG. 14, a contact may elect to receive email as a notification type for one class of events (ordinary events, e.g., such as "open/close" events) and text messages as a notification type for another class of events (emergency events, e.g. "panic" or "burglary" events). The contact may elect to receive a particular type of notification for an event type at one residence by one type of notification and for the same event type at a different residence by a different type of notification. For example, John Smith may elect to receive text messages for the "fire" event type at his own home at 16001 234th St, but may elect to receive voice calls for the "fire" event type at the home of his parent.

Operation 1930 may include at least one additional operation, which is operation 1932. Operation 1932 illustrates storing one or more data records associating one or more notification types with one or more event types for the one or more contacts, the one or more notification types including at least one or more of email responsive to a particular event type, mobile text responsive to a particular event type, or mobile call responsive to a particular event type. For example, as shown in and/or described with respect to FIGS. 1 through 17, and particularly with respect to FIG. 14, a contact may elect to be contacted via text message, email, voice call, via another communication means, or not be contacted at all for a particular event type.

Operation 1940 illustrates storing one or more data records associating one or more event types related to one or more residences with one or more contacts for receiving notifications regarding the one or more event types. For example, as shown in and/or described with respect to FIGS. 1 through 17, and particularly with respect to FIGS. 12 through 15, multiple contacts may be designated to receive notifications with respect to different event types at different residences via different notification types.

Figure 20:
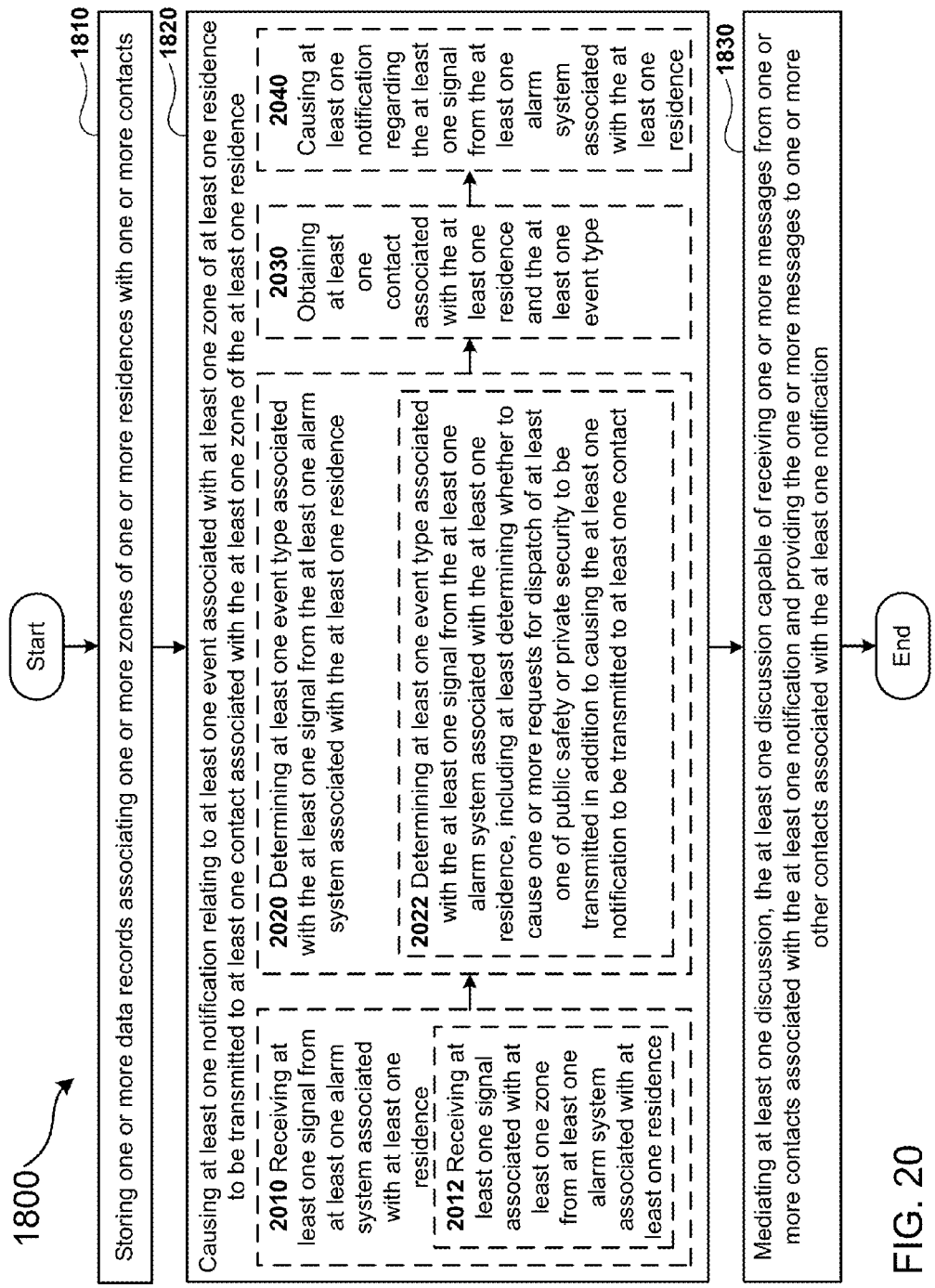

FIG. 20 illustrates alternative embodiments of the example operational flow 1800 of FIG. 18. FIG. 20 illustrates an example embodiment where operational flow 1820 may include at least one additional operation. Additional operations may include operation 2010 (which may include optional operation 2012), 2020 (which may include optional operation 2022), 2030, and 2040.

Operation 2010 illustrates receiving at least one signal from at least one alarm system associated with at least one residence. For example, as shown in and/or described with respect to FIGS. 1 through 17, and particularly with respect to FIGS. 10, 11, and 16, the community emergency response system, which may be subscribed to by a plurality of subscribers each of which may have one or many residences for which subscriptions have been procured, may receive a signal transmitted via the internet from an alarm panel at one of the residences for which a subscription is in effect. In some embodiments, the signal may arrive via a path other than the internet (e.g. PSTN, intranet, PBX, etc.).

Then, the operational flow moves to operation 2020. Operation 2020 illustrates determining at least one event type associated with the at least one signal from the at least one alarm system associated with the at least one residence. For example, as shown in and/or described with respect to FIGS. 1 through 17, the community emergency response system may ascertain the type of event either by receiving it directly from the alarm panel via the signal, or by deriving it based on other information (whether the alarm panel had been armed, for example, which implicates whether an event relating to an open contact switch is merely a benign open/close event or a burglary event).

Then, the operational flow moves to operation 2030. Operation 2030 illustrates obtaining at least one contact associated with the at least one residence and the at least one event type. For example, as shown in and/or described with respect to FIGS. 1 through 17, the community emergency response system will read configuration data stored previously to determine one or more contacts associated with the residence. As discussed previously, particularly with respect to FIG. 19, the one or more contacts may include a homeowner, resident, caregiver, employee, community monitor, volunteer, etc. The contact may be identifiable by an email address, a social network login, a search engine login, a username native to the community emergency response system, a telephone number, or other identification means.

Then, the operational flow moves to operation 2040. Operation 2040 illustrates causing at least one notification regarding the at least one signal from the at least one alarm system associated with the at least one residence. For example, as shown in and/or described with respect to FIGS. 1 through 17, and particularly with respect to FIGS. 10, 11, 16, and 17, the system will prepare a notification including the residence, the type of alert, the zone to which the alert applies, a date and time associated with the alert, and perhaps a number of contacts being notified about the alert among other information which may be included with the notification. The system will either transmit it directly to an email address, telephone number, or text message address (also a telephone number) designated by the configuration data records, or cause a different system to handle the transmission.

Operation 2010 may include at least one additional operation, which is operation 2012. Operation 2012 illustrates receiving at least one signal associated with at least one zone from at least one alarm system associated with at least one residence. For example, as shown in and/or described with respect to FIGS. 1 through 17, and particularly with respect to FIGS. 10, 11, 16, and 17, the signal received from an alarm panel associated with a particular residence may include an identification of a particular zone about which the signal was generated. As described elsewhere herein, a zone may include a single contact switch (either wired or wireless), one or more contact switches wired in series, motion detectors, substance detectors, panic buttons, etc.

Operation 2020 may include at least one additional operation, which is operation 2022. Operation 2022 illustrates receiving at least one signal associated with at least one zone from at least one alarm system associated with at least one residence. For example, as shown in and/or described with respect to FIGS. 1 through 17, and particularly with respect to FIGS. 10 and 11, the system may in addition to causing transmission of notifications to contacts, cause further transmissions of requests for assistance from public safety agencies or private security agencies (e.g. make a 911 call) where the type of event demands it (e.g. a medical emergency or fire emergency).

Figure 21:
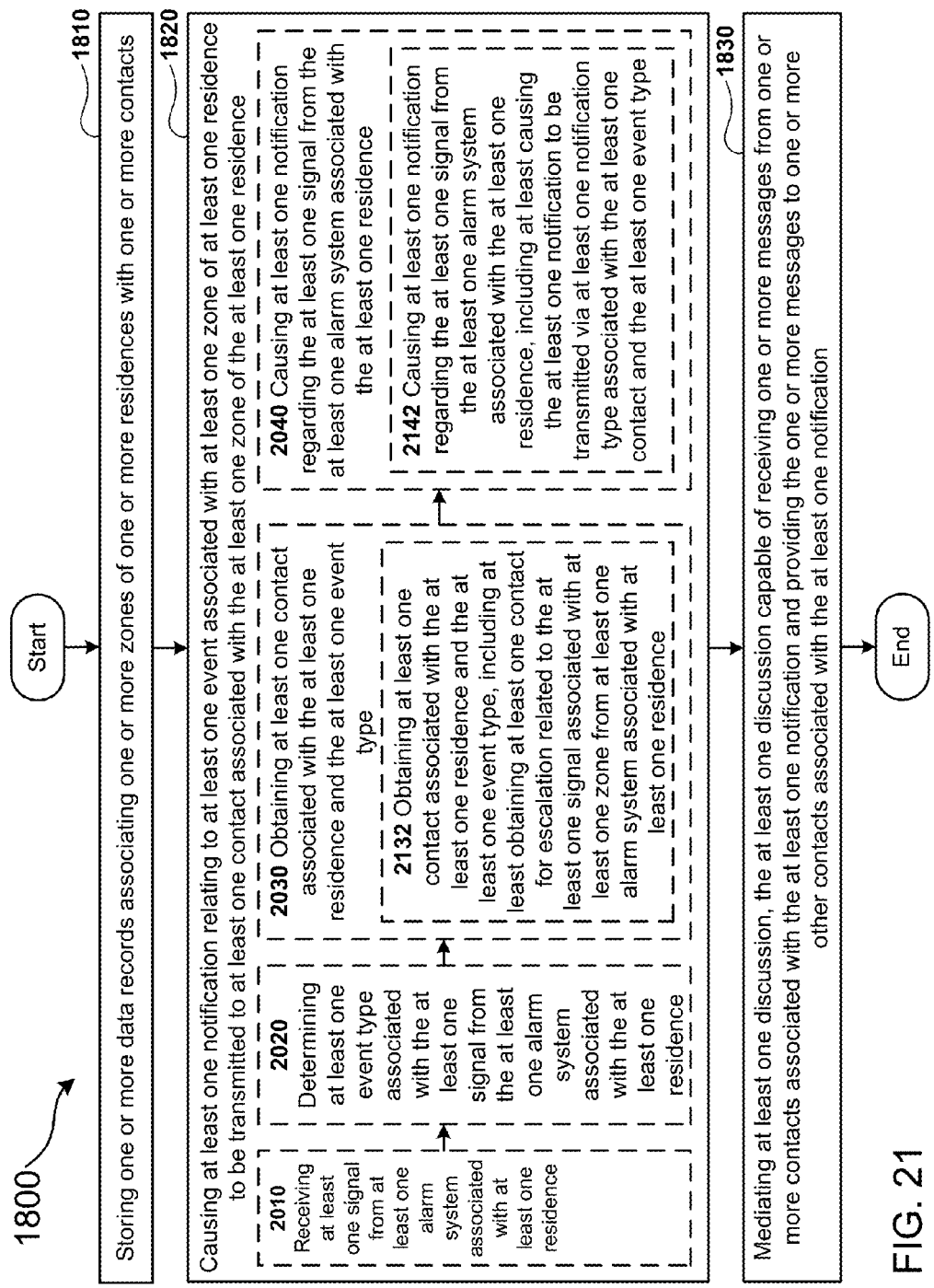

FIG. 21 illustrates alternative embodiments of the example operational flow 1800 of FIG. 18. FIG. 21 illustrates an example embodiment where operation 2030 may include at least one additional operation 2132, or where operation 2040 may include at least one additional operation 2142.

Operation 2030 may include at least one additional operation, which is operation 2132. Operation 2132 illustrates obtaining at least one contact associated with the at least one residence and the at least one event type, including at least obtaining at least one contact for escalation related to the at least one signal associated with at least one zone from at least one alarm system associated with at least one residence. For example, as shown in and/or described with respect to FIGS. 1 through 17, and particularly with respect to FIGS. 10 and 11, the community emergency response system may send notifications to one or more contacts regarding an event and may escalate the event by sending additional notifications to additional contacts under certain conditions. For example, if none of the contacts responds (e.g. nobody texts in the chat window, nobody marks the event as resolved, etc.) within a certain time limit, the system may send notifications to additional contacts or, as a fail-safe, to a private security service, a legacy alarm monitoring company, and/or a public safety agency (police, fire etc.). Alternatively, if each contact touches the "I'm Unavailable" button the escalation may occur. Or, if some contacts touch "I'm Unavailable" and the other contacts originally notified do not respond at all, the escalation may occur. Or, if a contact writes a message that he will check the event out, but is not heard from or does not mark the event as resolved within a certain amount of time, the escalation may occur.

Operation 2040 may include at least one additional operation, which is operation 2142.

Operation 2142 illustrates causing at least one notification regarding the at least one signal from the at least one alarm system associated with the at least one residence, including at least causing the at least one notification to be transmitted via at least one notification type associated with the at least one contact and the at least one event type. For example, as shown in and/or described with respect to FIGS. 1 through 17, and particularly with respect to FIGS. 12 through 15, the community emergency response system will send notifications to contacts using the notification types configured for each contact and event type. For example, returning to FIG. 14, if the event is of the "panic" type, John Smith will receive a mobile text, but if the event is of the "supervisory" type, John Smith will receive an email. Each contact associated with the residence and the particular event type will receive the notification via the notification types configured in the data records.

Figure 22:
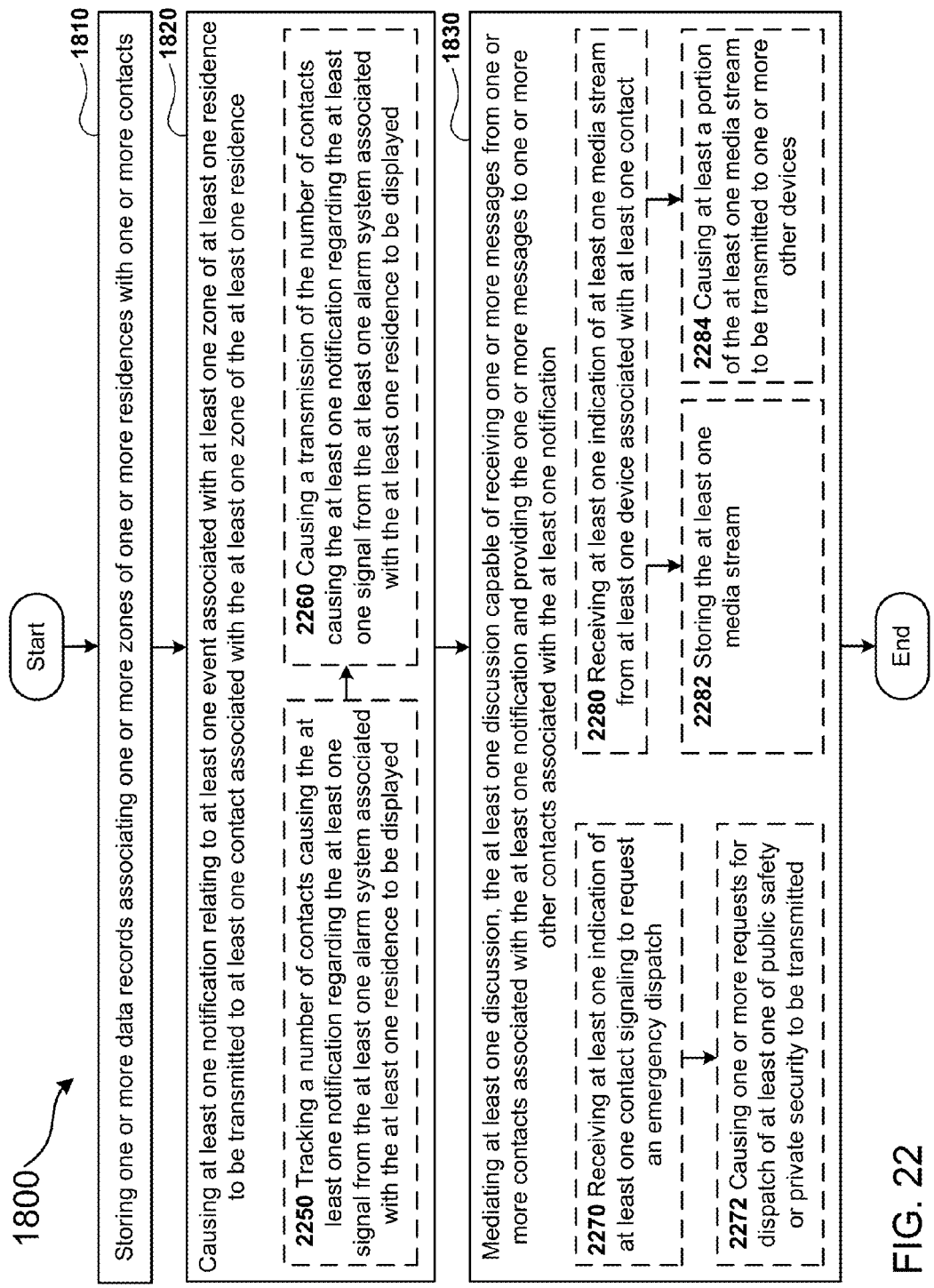

FIG. 22 illustrates alternative embodiments of the example operational flow 1800 of FIG. 18. FIG. 22 illustrates an example embodiment where operational flow 1820 may include at least one additional operation. Additional operations may include operation 2250 and operation 2260.

Operation 2250 illustrates tracking a number of contacts causing the at least one notification regarding the at least one signal from the at least one alarm system associated with the at least one residence to be displayed. Then, operation 2260 illustrates causing a transmission of the number of contacts causing the at least one notification regarding the at least one signal from the at least one alarm system associated with the at least one residence to be displayed. For example, as shown in and/or described with respect to FIGS. 1 through 17, and particularly with respect to FIG. 17, reference 1704, a burglary alert screen of a mobile CERS app or a browser dashboard/portal window into the system may indicate the number of contacts who have received the notification subsequent to the system transmitting this value, either with the notification or subsequent to all the contacts being notified. The value may be updated as additional contacts are notified, perhaps in response to an escalation. As contacts command the burglary alert screen to be displayed, it is inferred that the contacts have seen the burglary alert related to a particular notification, and the "seen by" value is incremented by the system and transmitted to all the contacts. In this manner, a contact may understand from viewing the "seen by" value that he or she is the only one who is aware of a particular alert (if the "seen by" value is "1" for example) and must take action, since nobody else knows of the alert.

FIG. 22 also illustrates an example embodiment where operational flow 1830 may include at least one additional operation. Additional operations may include operation 2270, operation 2272, and/or operation 2280 (which may include optional operation 2282 and/or optional operation 2284).

Operation 2270 illustrates receiving at least one indication of at least one contact signaling to request an emergency dispatch. Then, operation 2272 illustrates causing one or more requests for dispatch of at least one of public safety or private security to be transmitted. For example, as shown in and/or described with respect to FIGS. 1 through 17, and particularly with respect to FIGS. 10, 11, and 17, a user of a mobile CERS app on a smartphone or a user browsing the community emergency response system via a web portal or dashboard over the internet from a desktop, laptop, or other similar device, may engage a button labelled "911" (reference 1708 of FIG. 17) and public safety assistance can automatically be requested by the community emergency response system. As disclosed elsewhere herein, the community emergency response system (and specifically, the particular residence from which the alarm was generated) may be listed in the PSAP system so that public safety knows the location where assistance is needed.

Operation 2280 illustrates receiving at least one indication of at least one media stream from at least one device associated with at least one contact. For example, as shown in and/or described with respect to FIGS. 1 through 17, and particularly with respect to FIGS. 10, 11, and 17, a contact who is using a mobile CERS app on a mobile device may engage the movie capture ability of the mobile device (camera and microphone of a smartphone, e.g.) to transmit a media stream with video and/or audio being captured by the mobile device in real-time. In some embodiments, the media stream may include data which may be invisible (i.e. embedded metadata) or visibly overlaid over the video (e.g. location which may be street address and/or GPS coordinates, date, time, identity of person capturing video, identity and/or other information pertaining to alert generated, a picture-in-picture window with contents of a second video stream from a second image sensor on the smartphone or tablet, etc.). As disclosed elsewhere herein, the chat window may be utilized for contacts to request that the responder capture different scenes, or to notify the responder that enough video has been received.

Operation 2282 illustrates storing the at least one media stream. For example, as shown in and/or described with respect to FIGS. 1 through 17, an incoming media stream can be stored at the community emergency response system, either within a data store operably coupled with the community emergency response system, or at a location remote from the community emergency response system. The storage may include metadata or other indications relevant to the media stream received in conjunction with the incoming transmission of the media stream. The storage may be indexed or catalogued by the residence, by the zone, by the contact, by the date/time, or by other identifiers.

Operation 2284 illustrates causing at least a portion of the at least one media stream to be transmitted to one or more other devices. For example, as shown in and/or described with respect to FIGS. 1 through 17, the system may respond to a request to play back one or more portions of a media stream to a subscriber, to law enforcement, or to another remote system.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use engineering practices to integrate such described devices and/or processes into image processing systems. That is, at least a portion of the devices and/or processes described herein can be integrated into an image processing system via a reasonable amount of experimentation. Those having skill in the art will recognize that a typical image processing system generally includes one or more of a system unit housing, a video display device, a memory such as volatile and non-volatile memory, processors such as microprocessors and digital signal processors, computational entities such as operating systems, drivers, and applications programs, one or more interaction devices, such as a touch pad or screen, control systems including feedback loops and control motors (e.g., feedback for sensing lens position and/or velocity; control motors for moving/distorting lenses to give desired focuses. A typical image processing system may be implemented utilizing any suitable commercially available components, such as those typically found in digital still systems and/or digital motion systems.

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server. The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scaleable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a non-exclusive example, IaaS may include, e.g., one or more virtual server instantiations that may start, stop, access, and/or configure virtual servers and/or storage centers (e.g., providing one or more processors, storage space, and/or network resources on-demand, e.g., EMC and Rackspace). PaaS may include, e.g., one or more software and/or development tools hosted on an infrastructure (e.g., a computing platform and/or a solution stack from which the client can create software interfaces and applications, e.g., Microsoft Azure). SaaS may include, e.g., software hosted by a service provider and accessible over a network (e.g., the software for the application and/or the data associated with that software application may be kept on the network, e.g., Google Apps, SalesForce). DaaS may include, e.g., providing desktop, applications, data, and/or services for the user over a network (e.g., providing a multi-application framework, the applications in the framework, the data associated with the applications, and/or services related to the applications and/or the data over the network, e.g., Citrix). The foregoing is intended to be exemplary of the types of systems and/or methods referred to in this application as "cloud" or "cloud computing" and should not be considered complete or exhaustive.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

All of the above U.S. patents, U.S. patent application publications, U.S. patent applications, foreign patents, foreign patent applications and non-patent publications referred to in this specification and/or listed in any Application Data Sheet, are incorporated herein by reference, in their entireties.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

This application may make reference to one or more trademarks, e.g., a word, letter, symbol, or device adopted by one manufacturer or merchant and used to identify and/or distinguish his or her product from those of others. Trademark names used herein are set forth in such language that makes clear their identity, that distinguishes them from common descriptive nouns, that have fixed and definite meanings, or, in many if not all cases, are accompanied by other specific identification using terms not covered by trademark. In addition, trademark names used herein have meanings that are well-known and defined in the literature, or do not refer to products or compounds for which knowledge of one or more trade secrets is required in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or bracketed capitalization (e.g., [trademark name]), even when such trademark symbol does not explicitly appear next to the trademark. To the extent a trademark is used in a descriptive manner to refer to a product or process, that trademark should be interpreted to represent the corresponding product or process as of the date of the filing of this patent application.

Throughout this application, the terms "in an embodiment," "in one embodiment," "in some embodiments," "in several embodiments," "in at least one embodiment," "in various embodiments," and the like, may be used. Each of these terms, and all such similar terms should be construed as "in at least one embodiment, and possibly but not necessarily all embodiments," unless explicitly stated otherwise. Specifically, unless explicitly stated otherwise, the intent of phrases like these is to provide non-exclusive and non-limiting examples of implementations of the invention. The mere statement that one, some, or may embodiments include one or more things or have one or more features, does not imply that all embodiments include one or more things or have one or more features, but also does not imply that such embodiments must exist. It is a mere indicator of an example and should not be interpreted otherwise, unless explicitly stated as such.

While various aspects and embodiments have been disclosed herein, other aspects and embodiments will be apparent to those skilled in the art. The various aspects and embodiments disclosed herein are for purposes of illustration and are not intended to be limiting. It is intended that the scope of this disclosure be defined by the following claims and their equivalents.

What is claimed is:

1. A consumer emergency response system, comprising:
    circuitry configured for storing one or more data records associating one or more zones of one or more residences with one or more contacts;
    circuitry configured for storing one or more data records associating the one or more contacts with one or more event types related to the one or more residences which may be sent to the one or more contacts;
    circuitry configured for causing at least one notification relating to at least one event associated with at least one zone of at least one residence to be transmitted to at least one contact associated with the at least one zone of the at least one residence, including at least:
        circuitry configured for tracking a number of contacts causing the at least one notification relating to the at least one event associated with the at least one zone of the at least one residence to be displayed; and
        circuitry configured for causing a transmission of the number of contacts causing the at least one notification relating to the at least one event associated with the at least one zone of the at least one residence to be displayed; and
    circuitry configured for mediating at least one discussion, including at least:
        circuitry configured for receiving one or more messages from one or more contacts associated with the at least one notifications;
        circuitry configured for providing the one or more messages to one or more other contacts associated with the at least one notification;
        circuitry configured for receiving at least one indication of at least one contact signaling to request an emergency dispatch; and
        circuitry configured for causing one or more requests for dispatch of at least one of public safety or private security to be transmitted.

2. The consumer emergency response system of claim 1, wherein circuitry configured for storing one or more data records associating one or more zones of one or more residences with one or more contacts comprises:
    circuitry configured for storing one or more data records associating one or more contacts with at least one of a native login, a social network login, or a search engine login.

3. The consumer emergency response system of claim 1, wherein circuitry configured for storing one or more data records associating one or more zones of one or more residences with one or more contacts comprises:
    circuitry configured for storing one or more data records associating the one or more contacts with the one or more residences.

4. The consumer emergency response system of claim 1, wherein circuitry configured for storing one or more data records associating the one or more contacts with one or more event types related to the one or more residences which may be sent to the one or more contacts comprises:
    circuitry configured for storing the one or more data records, the one or more data records specifying at least one of the one or more contacts for at least one event type of the one or more event types to which at least one alert will be sent subsequent to at least one event of the at least one of the one or more event types occurring.

5. The consumer emergency response system of claim 1, wherein circuitry configured for storing one or more data records associating one or more zones of one or more residences with one or more contacts comprises:

circuitry configured for storing one or more data records associating one or more notification types with one or more event types for the one or more contacts.

6. The consumer emergency response system of claim 5, wherein circuitry configured for storing one or more data records associating one or more notification types with one or more event types for the one or more contacts comprises:
   circuitry configured for storing one or more data records associating one or more notification types with one or more event types for the one or more contacts, the one or more notification types including at least one or more of email responsive to a particular event type, mobile text responsive to a particular event type, or mobile call responsive to a particular event type.

7. The consumer emergency response system of claim 1, wherein circuitry configured for storing one or more data records associating one or more zones of one or more residences with one or more contacts comprises:
   circuitry configured for storing one or more data records associating one or more event types related to one or more residences with one or more contacts for receiving notifications regarding the one or more event types.

8. The consumer emergency response system of claim 1, wherein circuitry configured for causing at least one notification relating to at least one event associated with at least one zone of at least one residence to be transmitted to at least one contact associated with the at least one zone of the at least one residence comprises:
   circuitry configured for receiving at least one signal from at least one alarm system associated with at least one residence;
   circuitry configured for determining at least one event type associated with the at least one signal from the at least one alarm system associated with the at least one residence;
   circuitry configured for obtaining at least one contact associated with the at least one residence and the at least one event type; and
   circuitry configured for causing at least one notification of the at least one contact regarding the at least one signal from the at least one alarm system associated with the at least one residence.

9. The consumer emergency response system of claim 8, wherein circuitry configured for receiving at least one signal from at least one alarm system associated with at least one residence comprises:
   circuitry configured for receiving at least one signal associated with at least one zone from at least one alarm system associated with at least one residence.

10. The consumer emergency response system of claim 8, wherein circuitry configured for determining at least one event type associated with the at least one signal from the at least one alarm system associated with the at least one residence comprises:
   circuitry configured for determining at least one event type associated with the at least one signal from the at least one alarm system associated with the at least one residence, including at least determining whether to cause one or more requests for dispatch of at least one of public safety or private security to be transmitted in addition to causing the at least one notification to be transmitted to at least one contact.

11. The consumer emergency response system of claim 8, wherein circuitry configured for obtaining at least one contact associated with the at least one residence and the at least one event type comprises:
   circuitry configured for obtaining at least one contact associated with the at least one residence and the at least one event type, including at least obtaining at least one contact for escalation related to the at least one signal associated with at least one zone from at least one alarm system associated with at least one residence.

12. The consumer emergency response system of claim 8, wherein circuitry configured for causing at least one notification regarding the at least one signal from the at least one alarm system associated with the at least one residence comprises:
   circuitry configured for causing at least one notification regarding the at least one signal from the at least one alarm system associated with the at least one residence, including at least causing the at least one notification to be transmitted via at least one notification type associated with the at least one contact and the at least one event type.

13. The consumer emergency response system of claim 1, wherein circuitry configured for mediating at least one discussion comprises:
   circuitry configured for facilitating, via one or more of at least one mobile app or at least one website, an online discussion among the one or more contacts.

14. The consumer emergency response system of claim 1, wherein circuitry configured for mediating at least one discussion comprises:
   circuitry configured for receiving at least one indication of at least one media stream from at least one device associated with at least one contact.

15. The consumer emergency response system of claim 14, further comprising:
   circuitry configured for storing the at least one media stream.

16. The consumer emergency response system of claim 14, further comprising:
   circuitry configured for causing at least a portion of the at least one media stream to be transmitted to one or more other devices.

17. The consumer emergency response system of claim 1, further comprising:
   circuitry configured for receiving at least one indication of at least one contact signaling that the at least one event is resolved.

18. The consumer emergency response system of claim 1, wherein the circuitry is effected in at least one cloud-based server configured for replacement of a central monitoring center by facilitating communications between one or more home-based systems and one or more user devices associated with the one or more contacts.

19. A consumer emergency response system, comprising:
   at least one computing device;
   at least one data store; and
   at least one non-transitory computer-readable medium including one or more instructions which, when executed by the at least one computing device, cause the at least one computing device to perform one or more operations including at least:
      storing one or more data records associating one or more zones of one or more residences with one or more contacts;
      storing one or more data records associating the one or more contacts with one or more event types related to the one or more residences which may be sent to the one or more contacts;

causing at least one notification relating to at least one event associated with at least one zone of at least one residence to be transmitted to at least one contact associated with the at least one zone of the at least one residence, including at least:
- tracking a number of contacts causing the at least one notification relating to the at least one event associated with the at least one zone of the at least one residence to be displayed; and
- causing a transmission of the number of contacts causing the at least one notification relating to the at least one event associated with the at least one zone of the at least one residence to be displayed; and mediating at least one discussion, including at least:
- receiving one or more messages from one or more contacts associated with the at least one notification;
- providing the one or more messages to one or more other contacts associated with the at least one notifications;
- receiving at least one indication of at least one contact signaling to request an emergency dispatch; and
- causing one or more requests for dispatch of at least one of public safety or private security to be transmitted.

20. A method for at least one computing device associated with a consumer emergency response system, comprising:

storing, in at least one data store operatively coupled with the at least one computing device, one or more data records associating one or more zones of one or more residences with one or more contacts;

storing, in the at least one data store operatively coupled with the at least one computing device, one or more data records associating the one or more contacts with one or more event types related to the one or more residences which may be sent to the one or more contacts;

causing at least one notification relating to at least one event associated with at least one zone of at least one residence to be transmitted from the at least one computing device to at least one contact associated with the at least one zone of the at least one residence, including at least:
- tracking a number of contacts causing the at least one notification relating to the at least one event associated with the at least one zone of the at least one residence to be displayed; and
- causing a transmission of the number of contacts causing the at least one notification relating to the at least one event associated with the at least one zone of the at least one residence to be displayed; and mediating at least one discussion, including at least:
- receiving one or more messages from one or more contacts associated with the at least one notification;
- providing the one or more messages to one or more other contacts associated with the at least one notification;
- receiving at least one indication of at least one contact signaling to request an emergency dispatch; and
- causing one or more requests for dispatch of at least one of public safety or private security to be transmitted from the at least one computing device.

\* \* \* \* \*